United States Patent [19]

Holsinger et al.

[11] 4,055,808
[45] Oct. 25, 1977

[54] DATA COMMUNICATIONS NETWORK TESTING SYSTEM

[75] Inventors: Jerry L. Holsinger, Boston; David L. Lyon, Cambridge; David E. Williams, Andover; Frank B. Lezotte, Chelmsford; Don I. Falkenstein, Burlington, all of Mass.

[73] Assignee: Intertel, Inc., Burlington, Mass.

[21] Appl. No.: 688,330

[22] Filed: May 20, 1976

[51] Int. Cl.$^2$ .............................................. H04B 1/72
[52] U.S. Cl. .................................... 325/67; 178/69 G
[58] Field of Search ................... 325/67, 363; 324/51, 324/52, 72; 179/175; 178/69 R, 69 G, 69 L; 340/146.1 C, 347 R, 347 DF

[56] References Cited

U.S. PATENT DOCUMENTS

| | | | |
|---|---|---|---|
| 3,743,938 | 7/1973 | Davis | 325/67 |
| 3,875,500 | 4/1975 | Fletcher | 178/69 A |
| 3,909,720 | 9/1975 | Fantera | 325/363 |
| 3,988,678 | 10/1976 | Hodge | 325/67 |

*Primary Examiner*—Benedict V. Safourek
*Attorney, Agent, or Firm*—Cesari and McKenna

[57] ABSTRACT

A testing facility for a data communications network including modulators and demodulators, or modems, at central sites, at intermediate, or hubbing, sites, and at remote sites. Hubbing site testing units connect to respective host modems at the intermediate sites. The central testing unit transmits control words containing line address, drop address, and command characters. A configuration control circuit in each hubbing site testing unit generates signals that designate the particular location of the testing unit at the hubbing site. A validation circuit in each testing unit enables the testing unit to respond to the command character if two valid control words are received in succession. Thereafter the testing unit transmits back to the central testing unit signals in response to the test defined by the command character. If the line and drop address characters do not designate that specific hubbing site testing unit, it repeats the command to other units as an outbound request and repeats inbound responses to the central testing unit. Circuitry for substituting command characters under special conditions and for altering the inbound responses are also included.

52 Claims, 13 Drawing Figures

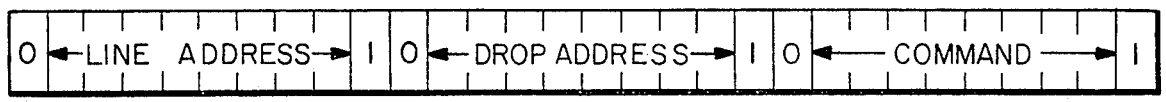

| 0 | ← LINE ADDRESS → | 1 | 0 | ← DROP ADDRESS → | 1 | 0 | ← COMMAND → | 1 |

FIG. 4

| COMMAND NUMBER | COMMAND CODE BINARY NUMBER | SELECT BITS | COMMAND |
|---|---|---|---|
| 1 | 0 0 0 0 1 | 1 1 1 | LINE CONTINUITY |
| 2 | 0 0 0 1 0 | 1 1 1 | TERMINAL DISABLE |
| 3 | 0 0 0 1 1 | 1 1 0 | TERMINAL POWER |
| 4 | 0 0 1 0 0 | 1 1 1 | MODEM TEST WITH ERRORS |
| 5 | 0 0 1 0 1 | 1 1 0 | MODEM TEST |
| 6 | 0 0 1 1 0 | 1 1 0 | MONITOR BA LEAD |
| 7 | 0 0 1 1 1 | 0 0 1 | BB |
| 8 | 0 1 0 0 0 | 1 1 1 | CA |
| 9 | 0 1 0 0 1 | 1 1 0 | CB |
| 10 | 0 1 0 1 0 | 1 1 0 | CC |
| 11 | 0 1 0 1 1 | 0 0 1 | CF |
| 12 | 0 1 1 0 0 | 1 1 0 | CG |
| 13 | 0 1 1 0 1 | 0 0 1 | DB |
| 14 | 0 1 1 1 0 | 0 0 1 | DD |
| 15 | 0 1 1 1 1 | 0 0 0 | MONITOR PT |
| 16 | 1 0 0 0 0 | 1 1 1 | STREAMING SEARCH |
| 17 | 1 0 0 0 1 | 1 1 0 | CANCEL STREAMING |
| 18 | 1 0 0 1 0 | 1 1 0 | MODEM SELECT |
| 19 | 1 0 0 1 1 | 0 0 1 | MODEM TRANSFER |
| 20 | 1 0 1 0 0 | 1 1 0 | DDD RTN |
| 21 | 1 0 1 0 1 | 0 0 1 | ISRT RXER |
| 22 | 1 0 1 1 0 | 0 0 1 | LINE LOOP |
| 23 | 1 0 1 1 1 | 0 0 0 | TX RX QUAL |
| 24 | 1 1 0 0 0 | 1 1 0 | NOT USED |
| 25 | 1 1 0 0 1 | 0 0 1 | NOT USED |
| 26 | 1 1 0 1 0 | 0 0 1 | LINE LEVEL |
| 27 | 1 1 0 1 1 | 0 0 0 | NOT USED |
| 28 | 1 1 1 0 0 | 0 0 1 | NOT USED |
| 29 | 1 1 1 0 1 | 0 0 0 | NOT USED |
| 30 | 1 1 1 1 0 | 0 0 0 | NOT USED |

FIG. 5

DATA COMMUNICATIONS NETWORK TESTING SYSTEM

CROSS REFERENCES TO RELATED APPLICATIONS

U.S. patent application Ser. No. 503,625 having a filing date of Nov. 4, 1974 for Data Processing System Testing Circuits.

U.S. patent application Ser. No. 665,256, filed Mar. 9, 1976 for an Automatic Switching Unit for Data Communications Network, which application is a continuation-in-part of Ser. No. 508,278, filed Sept. 23, 1974 and now abandoned.

BACKGROUND OF THE INVENTION

This invention generally relates to digital data communications networks and more specifically to diagnostic circuits used in those networks.

A typical digital communications network includes a central site and one or more remote sites, or "drops." Each such remote site connects to the central site by means of telephone or other equivalent communications links. Typically there is a modulator-demodulator (i.e., a modem) at each of the central and remote sites.

The aforementioned U.S. application Ser. No. 503,625 discloses diagnostic circuitry that is used in such digital data communications networks. This circuitry connects to the modem of each site and allows an operator at a central site to identify the diagnostic circuitry at any one of several remote sites, and then to test the corresponding modem. Such a modem is a "host" modem and the diagnostic circuitry is used to ascertain the operative status of the host modem, in many cases without interrupting normal communications over the communications link. This circuitry, however, is limited to a network in which there are no intervening modems between the central site and each designated remote site.

In some networks, however, the remote sites are widely dispersed geographically. Yet within such networks, several remote sites might be clustered geographically. A digital data communications network, to which the system described in the forementioned Ser. No. 503,625 is applied, requires redundant telephone lines between the various sites. In a typical application, for example, a central site might be located in New York City and one or more groups of remote sites located in Cleveland and Akron, Ohio. Such a system requires two telephone lines. One telephone line extends from New York City to Cleveland and the other telephone line extends from New York City to Akron. The two New York-to-Cleveland telephone lines are redundant.

Therefore, digital data communications networks now interpose a "hubbing" site, when possible, to eliminate the redundant telephone lines. For example, Cleveland could be selected as a hubbing site, and therefore, the system would require only one telephone line between New York City and Cleveland. Then one line would connect to the remote sites in Cleveland and another line would extend from the Cleveland hubbing site to all the remote sites in Akron. Such a hubbing site usually contains either a time-division or frequency-division multiplexer and demultiplexer to properly switch communications between the single line from New York City and the two lines from Cleveland and Akron.

Due to the characteristics of various multiplexers, time-division multiplexing is preferred in these systems. Time-division multiplexing allows greater amounts of data to pass through the hubbing site. However, this method requires binary signals, so it is necessary to convert the incoming analog signals into binary signals and then to reconvert the binary signals into analog signals as data passes through the hubbing site. Even so, time-division multiplexers are more simple to construct and operate than are frequency-division multiplexers.

As the diagnostic circuitry described in the foregoing application requires that the remote site and central testing unit be coupled by a "continuous" analog path, e.g., a telephone line, this diagnostic circuitry can not be used in these new types of digital data communications networks. Basically, the conversion to a digital form at each hubbing site constitutes a digital barrier through which analog testing messages cannot pass.

In other typical systems, the digital data communications network may include multiple computers and their respective communications facilities for connection to various terminals. In such networks it is desirable to diagnose problems in any individual computer or any of its connected terminals from a single site. Again, the foregoing diagnostic circuitry in Ser. No. 503,625 will not operate in such a mode because the analog testing message encounters a digital barrier.

Therefore, it is an object of this invention to provide diagnostic circuitry which can be used flexibly in conjunction with various types of digital data communications networks.

Another object of this invention is to provide a diagnostic test circuitry that is operable accross digital barriers.

Still another object of this invention is to provide diagnostic circuitry which is compatible with prior diagnostic circuitry.

SUMARY OF THE INVENTION

In accordance with this invention, an operator at a central site can test any site in the system by selectively actuating line address, drop address and command switches, thereby to designate a particular testing unit in the network. A central testing unit then transmits a three-character test control word that contains line address, drop address, and command characters. When a testing unit constructed in accordance with this invention and located at a hubbing site receives a test control word, it generates an enabling signal if the line and drop address characters correspond to its line and drop addresses. Such a hubbing site testing unit responds to its enabling signal by performing a test and generating a response for return to the central site. When a hubbing site testing unit receives a test control word that designates another hubbing site or a remote site, its response depends upon its location in the network. It may repeat the test control word to the other testing unit and couple the ensuing response back to the central site. Alternatively, it may modify the test control word, the ensuing response or both.

This invention is pointed out with particularity in the appended claims. The above and further objects and advantages of this invention may be more readily understood by referring to the following detailed description taken in conjunction with the accompanying drawings.

BRIEF DESCRIPTION OF THE DRAWINGS

FIG. 4 depicts the organization of a test control word transmitted by the central testing unit shown in FIG. 3;

FIG. 5 is a list of command characters that are used in accordance with this invention;

DESCRIPTION OF AN ILLUSTRATIVE EMBODIMENT

Figure 1:
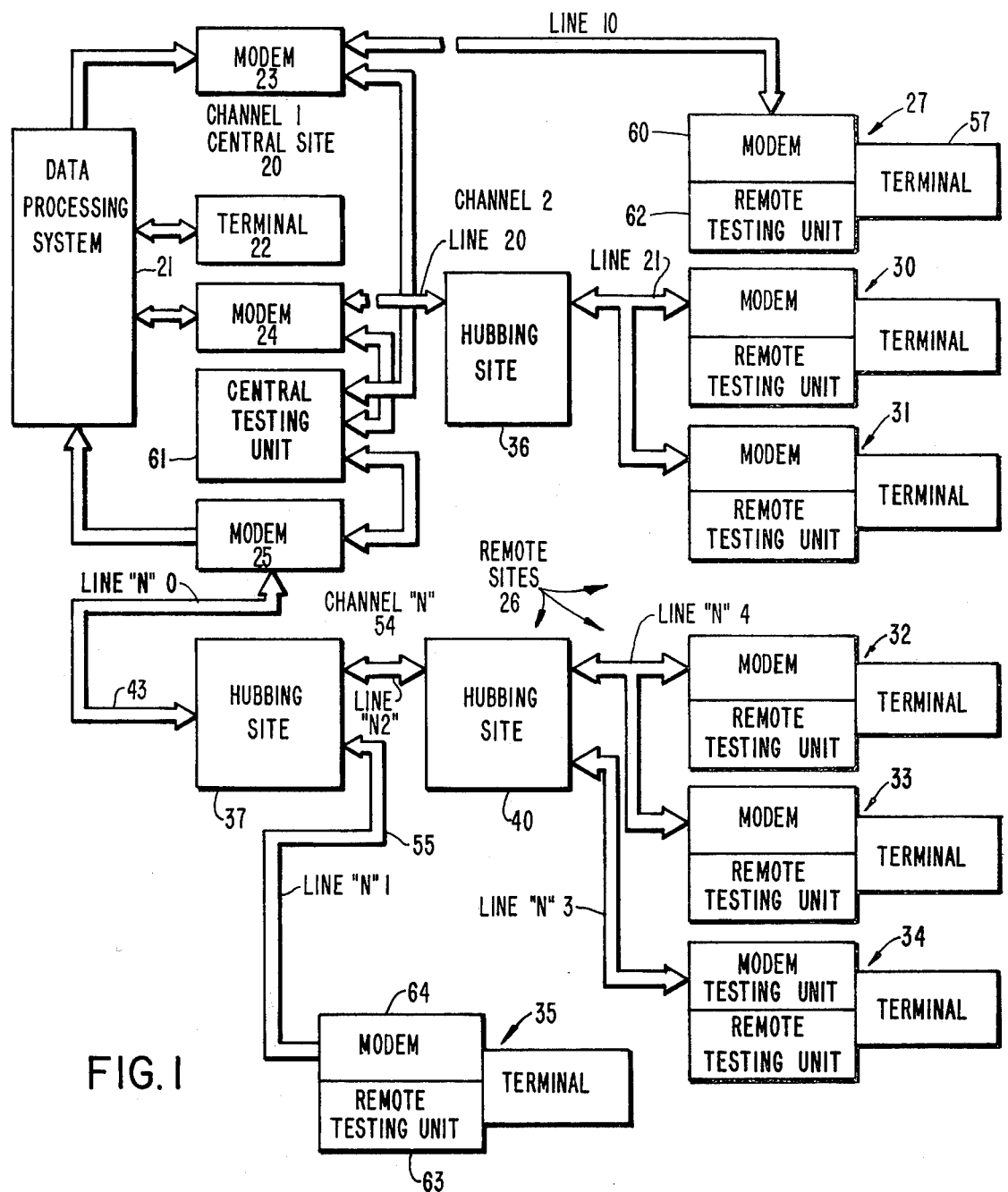
FIG. 1 is a block diagram of a typical digital data communications network to which this invention can be applied.

In accordance with conventional practice, a digital data communications network operates under the control of the equipment at a central site 20 as shown in FIG. 1.

A typical central site 20 includes a data processing system 21 and central input/output devices represented by a terminal 22. The data processing system 21 includes data communications circuits for transmitting and receiving binary signals over a plurality of input/output channels. FIG. 1 shows CHANNEL 1 connected to a modulator-demodulator circuit (i.e., modem) 23; CHANNEL 2 to a modem 24 and CHANNEL N, to a modem 25. The data processing system controls the transfer of information over these and other channels in order to communicate with specific remote sites 26. The word "drop" is also used to refer to remote sites. Remote site 27 is an example of a drop connected to LINE 10 coming from the modem 23. Remote sites 30 through 35 also connect the data processing system 21 but they are different from the remote site 27 because they connect to the data processing system 21 through intermediate hubbing sites 36, 37 and 40.

Figure 2:
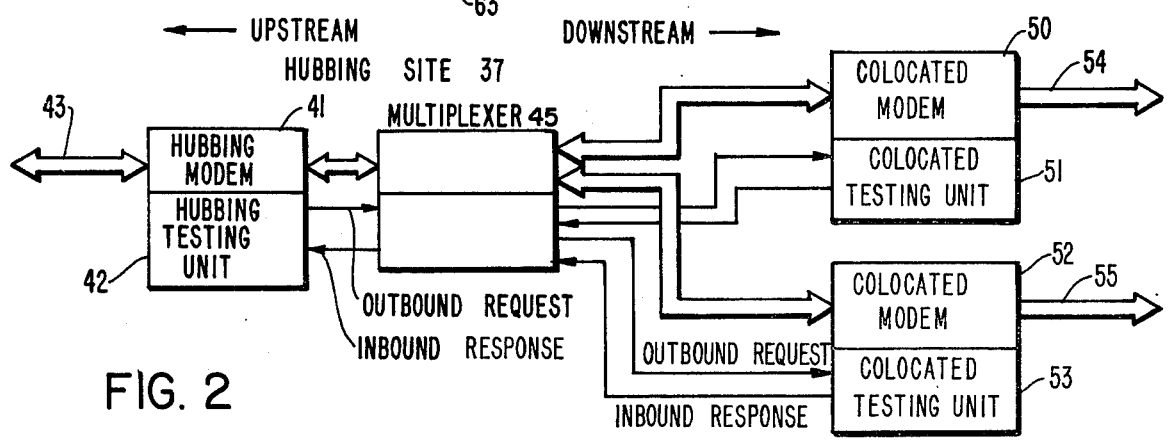
FIG. 2 is a detailed block diagram of the hubbing site shown in FIG. 1.

FIG. 2 depicts the general arrangement of circuits in the hubbing site 37. This hubbing site comprises a "hubbing" modem 41 and a "hubbing" testing unit 42 that connect to the analog conductors 43 from the modem 25. These conductors 43 typically are the telephone lines and they carry modulated carrier signals to and from the hubbing modem 41. The testing signals that pass from the central site 20 on the conductors 43 to the hubbing testing unit 42 are called "outbound request" signals. With respect to the hubbing testing unit 42, these conductors connect to an "upstream connection," "upstream" meaning in the direction of the central site.

The hubbing modem 41 is a "host modem" for the testing unit 42. The unit 42 contains its own modem for converting the outbound request signals in analog form to digital signals. The digital signals are transmitted downstream to the multiplexer 45. Also the unit 42 receives "inbound response" signals in digital form from the multiplexer 45. These digital signals are converted into a modulated carrier signal that is transmitted toward the central testing unit.

The modem 41 and connected testing unit 42 are designated a "hubbing modem" and a "hubbing testing unit," respectively, because they are characterized by an analog "upstream" connection and a digital "downstream" connection.

Outbound request and other signals in digital form pass from the multiplexer 45 to the "upstream" connection of a "colocated" modem 50 and testing unit 51. The unit 51 transmits an outbound request signal in analog form onto conductors 54 at its "downstream" connection. Inbound response signals in analog form at the downstream connection are converted by the unit 51 into digital form for transmission to the multiplexer 45. The colocated testing unit 51 connects to its "host" modem 50.

A "colocated" modem 52 and colocated testing unit 53 perform a similar function with respect to the transfer of signals between the multiplexer 45 and the remote site 35 shown in FIG. 1. Thus, a "colocated" testing unit has digital upstream and analog downstream connections while a "hubbing" testing unit has analog upstream and digital downstream connections.

As apparent from FIGS. 1 and 2, a colocated testing unit may connect either to a remote testing unit at a terminal, such as the unit 63 at remote site 35 or to a hubbing testing unit such as the unit at the hubbing site 40. The former connection is designated an "MPEXT" connection and the testing unit is designated as an "MPEXT" testing unit. Units characterized by the second connection are designated "CLEXT" testing units. Thus, the unit 51 is a CLEXT testing unit; and the testing unit 53, an MPEXT testing unit.

Although the testing units at these hubbing sites all have the same construction, their individual operation depends upon whether they are hubbing, CLEXT or MPEXT testing units. As will be apparent, the network in FIG. 1 does eliminate communications link (e.g., telephone line) redundancy. For example, if the central site 20 were located in New York City, then LINE 10 could represent a communications link to Hartford, Conn. If the remote sites 30 and 31 were located in Cleveland and Akron, respectively, then the hubbing site 36 could be located in Cleveland thereby eliminating redundant communications links between Cleveland and New York City. If the hubbing site 37 were located in Chicago, only one communications link would be necessary between New York and Chicago. The hubbing site 37 could then connect to a remote site 35 in Chicago and also to a secondary hubbing site 40 in St. Paul, Minn. Remote sites 32 and 33 might then be located in St. Paul, while the remote site 34 might be at some outlying location such as White Bear.

Of course, the number of communications links that are used is dependent upon the data transmission rates of the various links and terminals. If the modems 23, 24, and 25 each operate at a 9600 bps rate, then the remote site 27, and any other sites on LINE 10, could also operate at 9600 bps, assuming that LINE 10 is a dedicated, or "backbone," line. Remote sites 30 and 31 could operate at 4800 bps, with transfers between the central site 20 and the hubbing site 36 over communications link LINE 20 being at 9600 bps. Likewise, the hubbing site 37 could transfer data to the downstream remote site 35 and the hubbing site 40 at 4800 bps, with the links connected to the downstream connection of the hubbing site 40 operating at 2400 bps.

Typically, the data processing system 21 uses a polling sequence to select remote sites in order. For example, the system 21 could select LINE 10, identify remote site 27 and communicate with a terminal 57 through modems 23 and 60 at the 9600 bps rate. During such communications, the modem 23 would receive digital data from the system 21, encode and modulate it onto a carrier wave and then transmit the modulated signal onto LINE 10. At remote site 27, the modem 62 would receive the incoming signal from LINE 10, demodulate the signal and decode the demodulated signal. If other modems were connected to LINE 10, all modems connected to LINE 10 would receive the identification signals from the modem 23, but only the addressed terminal and its modem would respond.

When the terminal 57 transmits the data back to the data processing system 21, the modem 60 encodes the data and modulates a carrier signal with the encoded data. The carrier frequency may be different from the carrier frequency transmitted by the modem 23 in a "two-wire" system. In a "four-wire" system, the carrier frequencies are the same because different sets of conductors are used. As the operation of such a data communications network is well known in the art, no further discussion of its general operation is necessary.

In accordance with this invention, the central site 20 additionally includes a central testing unit 61. The central testing unit 61 connects to all the modems at the central site, such as modems 23, 24 and 25. Each remote site contains a remote testing unit connected to its host modem, such as the remote testing unit 62 at remote site 27 and a remote testing unit 63 at remote site 35 in FIG. 1. The testing units at the remote sites have the same general construction and configuration as the remote teting units that are described in the aforementioned U.S. patent application Ser. No. 503,625.

Each hubbing site also contains a testing unit that is constructed in accordance with this invention and that connects to each modem at the site. The hubbing site 37 shown in FIG. 2 contains three such testing units 42, 51 and 53.

Figure 3:
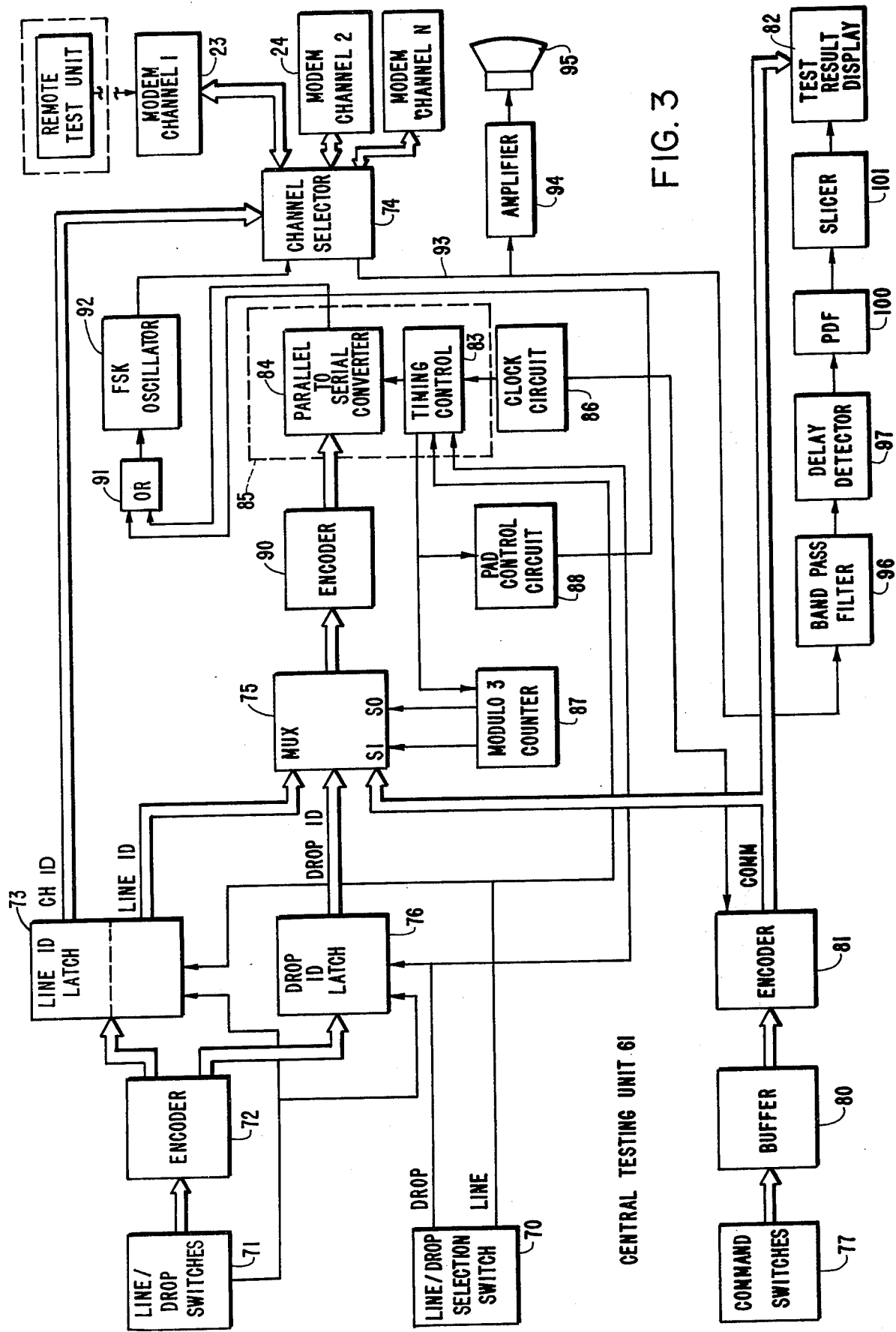
FIG. 3 is a detailed block diagram of the central testing unit shown in FIG. 1.

Before describing the construction of the testing units at the hubbing sites, it will be helpful to understand the construction and operation of the central testing unit 61 as shown in FIG. 3. That unit includes circuits for encoding and decoding digital data signals representing command and address characters. It modulates the encoded signals onto a carrier signal with a frequency that lies outside the frequency spectrum which the modem 23 normally uses for transferring data with remote modems. Each remote testing unit contains circuits for receiving these "out-of-band" modulated signals. Through the interconnections between the remote testing units and modems, the remote testing units perform various testing, monitoring and remedial functions in response to those modulated signals.

In the prior testing system described in U.S. application Ser. No. 503,625, a particular coding scheme is used that tends to assure proper operation of the central testing unit and remote units and that simplifies the circuitry in each remote testing unit. More specifically, the remote sites in that system respond to a test control word that comprises three characters: namely, a drop address character, a command character and a pad character. Each of the address and command characters includes a leading or synchronizing ZERO, a respective drop address or command byte, and a trailing ONE while the padding character comprises all ONES. Moreover, the drop address and command bytes are transmitted as "four-of-eight" codes. These codes can be divided into two separate groups by sampling the sixth and seventh bits. A first group of these codes contain 30 codes that are used as command codes while the second group contains forty codes that are used as drop addresses. Moreover, 30 command codes can be ordered by the binary value of the first five bits.

FIG. 4 depicts the organization of the test control word that is sent by the central testing unit in accordance with this invention. It includes a line address character comprising a synchronizing ZERO, a line address byte and a trailing ONE that replaces the padding character described in U.S. application Ser. No. 503,625. Thus, the test control word comprises line address, drop address and command characters. The drop address and command characters are identical to the codes described in U.S. application Ser. No. 503,625. The line address characters are taken from the remaining available codes. They generally comprise the binary codes for the line numbers.

FIG. 5 illustrates the different commands and their respective four-of-eight codes. These codes are ordered according to the binary values of the first five bit positions.

The test control word shown in FIG. 4 is not compatible with the test control words received by the prior remote site testing units. However, both the central site and the hubbing site testing units can convert the test control word to a format that is compatible.

Now referring to FIG. 3, we shall discuss the central testing unit 61. Assume that an operator wishes to perform an "auto sequencing" test during which a number of tests are performed in automatic sequence at remote site 31. The operator initiates the sequence by setting a line/drop selection switch 70 to the "line" position thereby to transmit a LINE signal. Then the operator sets the line/drop switches 71 to enter a two-digit number, e.g., "21" to designate a channel and a line on the channel. The "more significant" digit is entered first as the channel number. Thus, all lines on the channel have the same "more significant" digit. As each digit is entered, an encoder 72 generates binary-coded-decimal signals that are transferred into a LINE ID latch 73 in sequence. The first digit ("2" in this example) constitutes a CH ID signal that enables a channel selector 74 to route signals to the selected central site modem (e.g., 24 for channel 2). The remaining line digit is coupled to an input terminal of a multiplexer (MUX) 75.

Next, the operator enters the "drop" address by moving the line/drop selection switch 70 to the "drop" position and entering the drop number. The encoder 72 converts each decimal digital in sequence into binary-decimal-coded signals that are stored in a drop ID latch 76. The latch 76 is wired to convert the drop address into signals representing the binary number that is coupled to a second input terminal of the multiplexer 75.

When one of the command switches 77 is selected, a buffer 80 and encoder 81 produce COMM signals that are coupled to the multiplexer 75 and also to a test result display circuit 82. During an auto sequence, the encoder 81 generates a timed sequence of command codes.

Figure 9:
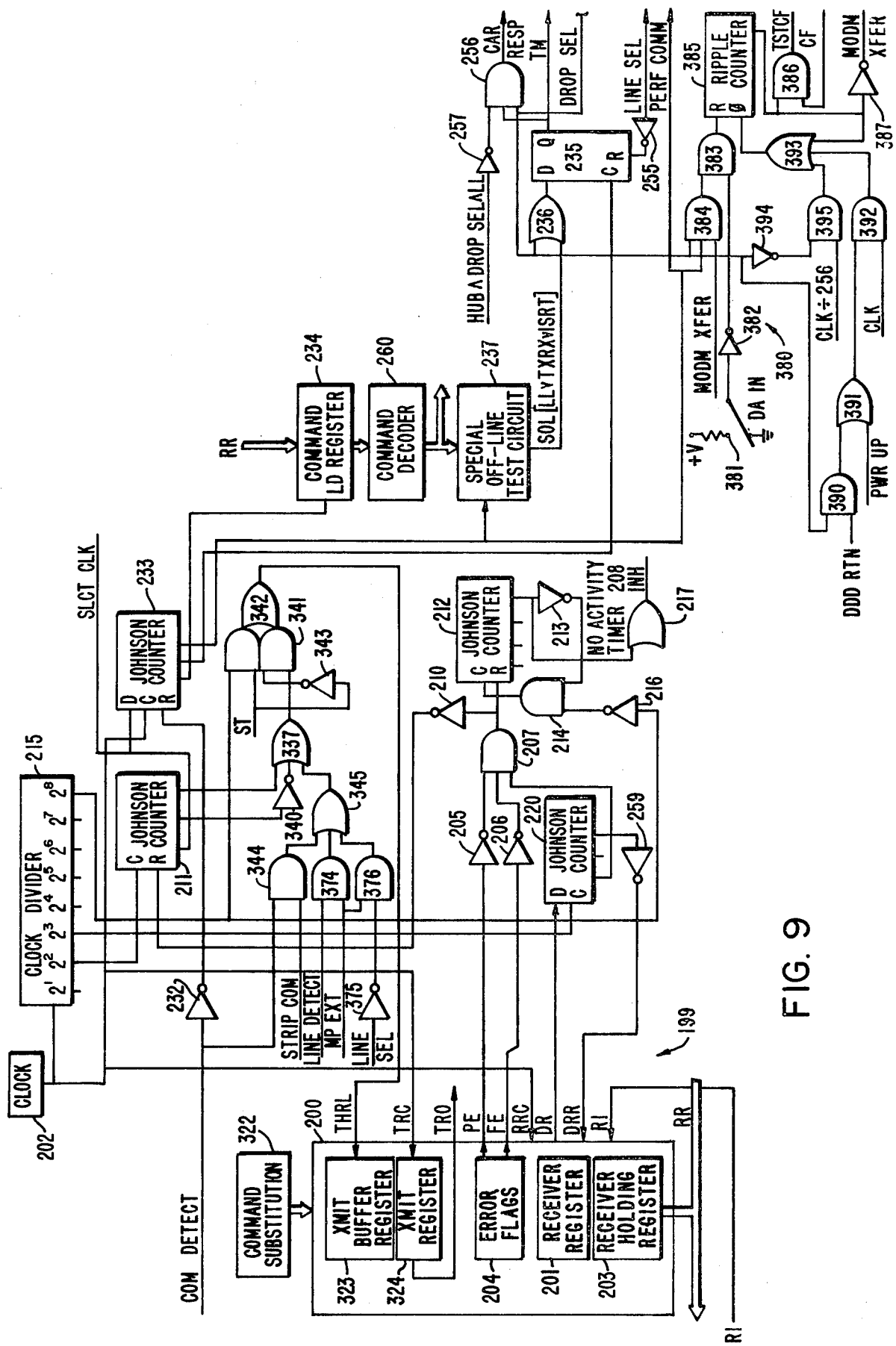
FIG. 9 is a detailed logic diagram of a portion of the function control unit shown in FIG. 8.

A timing control circuit 83 and a parallel-to-serial converter 84 constitute portions of an asynchronous receiver/transmitter 85 that is described more specifically with respect to FIG. 9. The parallel-to-serial converter 84 in the receiver/transmitter 85 converts parallel binary input signals into a serial sequence of binary signals.

The timing control circuit 83 receives clocking signals from a clock circuit 86 and produces an output signal each time a character is received thereby to energize a "modulo three" (MOD 3) counter 87 and a pad control circuit 88. Each time the MOD 3 counter advances, it enables the MUX 75 to couple the signals from the line ID latch 73, the drop ID latch 76 or the encoder 81 to an encoder 90. As the possible patterns of the signals are known, the encoder 90 can comprise a programmable read-only memory in which the signals from the multiplexer 75 constitute address signals to the memory; the contents and the data signals of each addressed location are then transferred to the parallel-to-serial converter 84. The asynchronous receiver/transmitter 85 transmits these binary signals in serial fashion through an OR gate 91 to an FSK oscillator 92 or other equivalent oscillator circuit that produces the modulated out-of-band carrier signal that is coupled to an appropriate channel and corresponding modem (CHANNEL 2 and modem 24 in this example).

Incoming response signals from the designated testing unit pass through the modem channel and the channel selector onto a conductor 93 in serial form. All these signals pass through an amplifier 94 to be broadcast over a speaker 95 to provide a means for checking the system in a qualitative manner.

In addition, the signals on the conductor 93 pass through a bandpass filter 96, a delay detector 97, a post detection filter (PDF) 100 and a slicer circuit to be coupled to the test result display 82. The test result display 82 contains a visual display for the line and drop addresses, the nature of the command and the test results.

Still referring to FIG. 3, the pad control circuit 88 contains a counter that is advanced periodically by the timing control circuit 83. After a predetermined number of test control words are transmitted, the pad control circuit 88 energizes the OR circuit 91 and turns on the FSK oscillator 92 for the interval of one character to transmit a sequence of ONES as the padding character. This periodic generation of a padding character is useful in maintaining the various testing units in synchronism. Also, if a channel connects to a line with no hubbing sites between the central site and a remote site, such as LINE 10 in FIG. 1, the test control word must comprise the drop address character, the command character and the padding character. The pad control circuit 88 can be wired to respond to a predetermined channel number (e.g., CHANNEL "1" for LINE 10 in FIG. 1) by energizing the OR gate 91 during intervals corresponding to the line address character time, thereby to override the output from the asynchronous receiver/transmitter 85.

Figure 6:
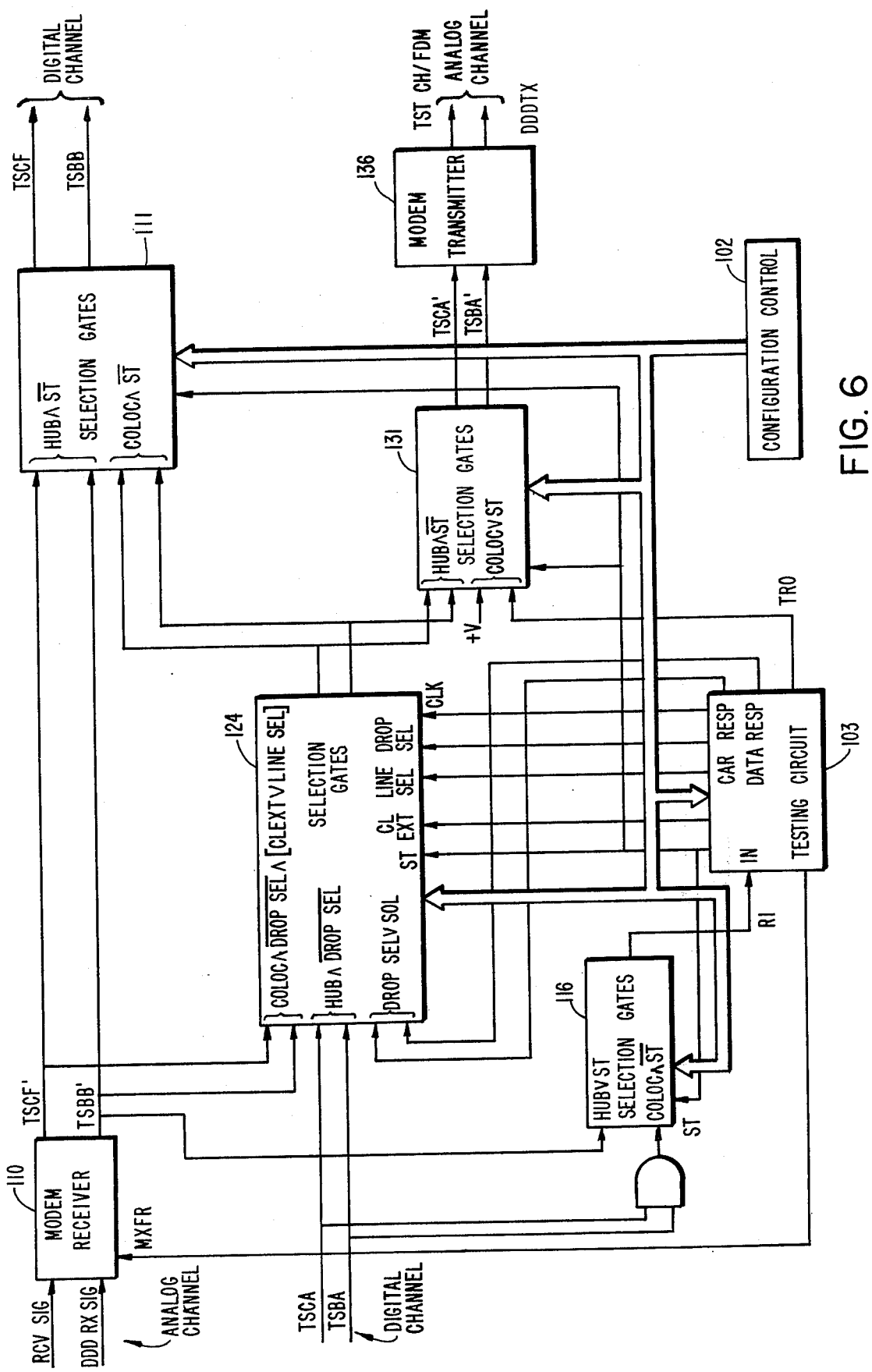
FIG. 6 is a block diagram of a gating arrangement for routing data through a hubbing site such as shown in FIGS. 1 and 2.
Figure 7:
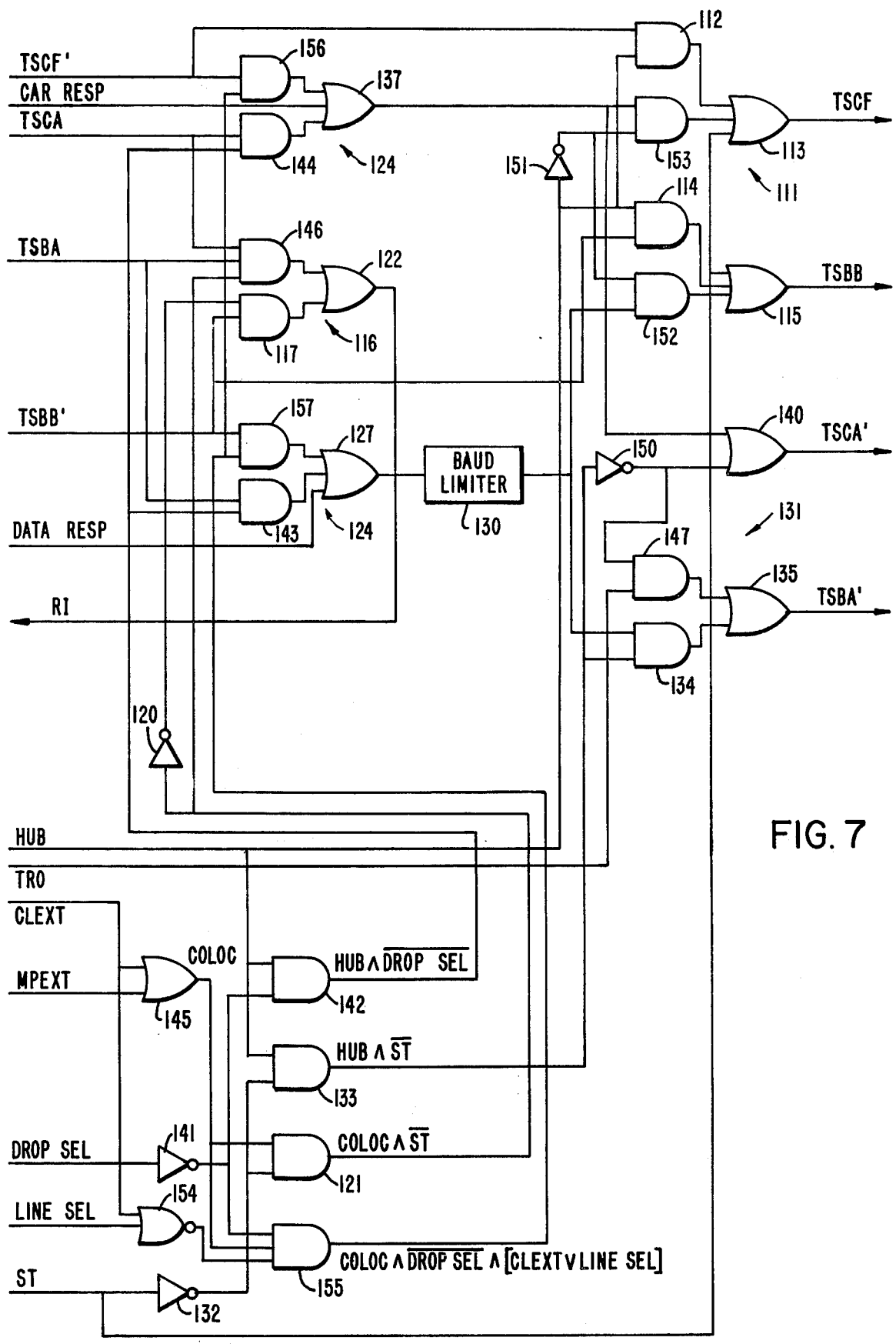
FIG. 7 is a detailed logic diagram of the circuitry shown in FIG. 6.

FIGS. 6 and 7 illustrate the data paths in each of the hubbing site testing units shown in FIG. 2. The particular signal paths for any transfer depend upon two factors: First, is the hubbing site testing unit operating as a hubbing, a CLEXT or an MPEXT testing unit? A configuration control circuit 102 generates an HUB, a CLEXT or an MPEXT signal when the testing unit is connected as a hubbing, CLEXT or MPEXT testing unit, respectively. Secondly, does the incoming signal represent an outbound request or an inbound response?

With a hubbing testing unit, the outbound request signals at the upstream connection (e.g., on the conductors 43 in FIG. 2) are received by a modem receiver 110. The modem receiver 110 transmits a TSCF' carrier control signal and a TSBB' data signal. The TSCF' and TSCF and the TSBB' and TSBB signals are test signals that are analogous to the conventional CF carrier detect and BB received data signals. Selection gates 111 respond to the HUB signal from the configuration control circuit 102 and the absence of an ST signal (described later), thereby to couple TSCF' carrier control and TSBB' data signals to the hubbing site multiplexer (45 in FIG. 2) as TSCF and TSBB signals, respectively. Referring to FIG. 7, the selection gates 111 include an AND gate 112, an OR gate 113, and AND gate 114 and an OR gate 115. The HUB signal enables the AND gates 112 and 114 to couple the TSCF' and TSBB' signals through the OR gates 113 and 115 as the TSCF and TSBB signals, respectively.

The HUB signal also enables selection gates 116 in FIG. 6 to convey the TSBB' data signals to the testing unit 103 as a series of binary RI signals. Again referring to FIG. 7, an AND gate 117 is enabled by an inverter 120 when the configuration control 102 transmits the HUB signal, because an AND gate 121 is not energized. Thus, the inverter 120 enables the AND gate 117 to pass the TSBB' signals through an OR gate 112 as the RI signals. The RI signals enter the testing circuit 103 shown in FIG. 6.

If the test control word identifies that particular testing circuit, the testing circuit 103 performs the test and generates a CAR RESP carrier control signal and a DATA RESP data signal to other selection gates 124. The DATA RESP signal represents the data to be transmitted upstream as an inbound response. This signal is coupled through an OR gate 127 in FIG. 7 to a baud limiter 130, such as the baud limiter described in U.S. patent application Ser. No. 503,625.

An inverter 132, in circuit with the ST signal, enables an AND gate 133 to enable an AND gate 134 that couples the output signals from the baud limiter 130 through an OR gate 135 as TSBA' data signals that are routed to a modem transmitter 136 in FIG. 6. The carrier signal in the modem transmitter 136 is turned on and off in response to the CAR RESP signal, which is coupled through OR gates 137 and 140 as a TSCA' carrier control signal. The TSCA and TSCA' signals correspond to other conventional CA carrier control signals; the TSBA and TSBA ' data signals, to the conventional BA transmitted data signal. The modem transmitter 136 in FIG. 6 responds to the TSCA' signal by generating a carrier signal and modulating it in accordance with the TSBA' signal for transmission back toward the central site.

When the test control word does not identify this particular hubbing testing unit, the selection gates 111 repeat the test control word downstream as previously described. However, that unit transmits neither the CAR RESP signal nor the DATA RESP signal. Moreover, the signal on a DROP SEL conductor from the testing unit 103 becomes inactive; so a signal from an inverter 141 and the HUB signal energize an AND gate 142, thereby to enable AND gates 143 and gate 144 in the selection gates 124. In this condition, an incoming TSCA carrier control signal that is received at the downstream connection as part of the upstream response is coupled through the AND gate 144 and the OR gates 137 and 140 to generate the TSCA' signal. In addition, the TSBA data signal, that also is a component of the inbound response at the downstream connection, is coupled through the AND gate 143, the OR gate 127, the baud limiter 130, the AND gate and the OR gate 135 to generate the TSBA' signal.

Thus, a hubbing testing unit converts the analog outbound request received at the upstream connection to a binary outbound request in its downstream connection. If the host modem at a hubbing site is designated by the test control word, the hubbing testing unit transmits its own response back onto the analog upstream connection as the inbound response. If the test control word designates a downstream testing unit and host modem, the hubbing testing unit converts the binary inbound response received at its downstream connection into an analog inbound response for transmission to the upstream connection.

When a hubbing site testing unit is to operate as a CLEXT testing unit, the configuration control 102 in FIG. 6 transmits the CLEXT signal. This signal energizes an OR gate 145 in FIG. 7, thereby to transmit a COLOC signal.

When the test control word identifies a CLEXT testing unit, the digital outbound request at the upstream connection is constituted by the TSCA carrier control signal and TSBA data signal. As shown in FIG. 6, these signals pass through the selection gates 116 to be transmitted to the testing circuit 103 as the RI signal. More specifically, the TSCA signal and a signal from the AND gate 121 enable an AND gate 146 to pass TSBA signals through the OR gate 122 as the RI signals. The testing unit 103 in FIG. 6 repeats these signals as TRO signals that pass through an AND gate 147 and the OR gate 135 in the selection gates 131 as the TSBA' signals. An inverter 150, receiving the output of the AND gate 133, enables the AND gate 147 whenever the HUB signal is inactive. Thus, the TSBA signal, as an outbound request signal, continues through a CLEXT testing unit as a TSBA' signal that controls the modem transmitter 136 connected to the outbound connection. As the inverter 150 energizes the OR gate 140, the OR gate 140 produces a continuous TSCA' signal for the modem transmitter 136.

When a CLEXT testing unit is identified by the test control word, its testing unit generates DATA RESP and CAR RESP signals. The DATA RESP signal passes through the OR gate 127 and the baud limiter 130. However, the HUB signal is inactive, so an inverter 151 enables an AND gate 152 to pass the output from the baud limiter 130 through the OR gate 115 as the TSBB signal that becomes an inbound response signal at the upstream connection. The CAR RESP signal passes through the OR gate 137 and another AND gate 153, also enabled by inverter 151, to become the TSCF signal.

When the test control word identifies a different testing unit, the TSCA and TSBA outbound request signals are coupled through the selection gates 116 and the testing circuit 103. As described later, the command character may or may not be modified as it passes through the testing circuit. Otherwise the CLEXT testing unit repeats the test control word downstream as previously described.

With respect to an inbound response, an OR gate 154 and an AND gate 155 produce an output signal that enables AND gates 156 and 157 in the selection gates 124. The AND gate 156 couples the inbound TSCF' signal from the downstream connection through the OR gate 137, the AND gate 153 and the OR gate 113 as the TSCF inbound response signal. Likewise, the TSBB' data signal is coupled through the AND gate 157, the OR gate 127, the baud limiter 130, the AND gate 152 and the OR gate 115 to become the TSBB data signal for the inbound response.

If the test control word specifies a different line, the outbound request TSCA and TSBA signals are conveyed to the modem transmitter 136 shown in FIG. 6 and as previously described. That is, the TSBA and TSCA signals are coupled through the input selection gates 116 and the testing circuit 103, thereby to be transmitted through the selection gates 131. When the inbound response appears at the downstream connection on the TSCF' and TSBB' conductors, the AND gate 156, the OR gate 137, the AND gate 153 and the OR gate 113 generate the TSCF signal. The data on the TSBB' line passes through the AND gate 157, the OR gate 127, the baud limiter 130, the AND gate 152 and OR gate 115 to become the TSBB signal.

Therefore, when the hubbing site testing unit is a CLEXT testing unit, the outbound request appears at the upstream connection on TSCA and TSBA conductors and at the downstream connection at the modem transmitter 136. If the test control word selects the CLEXT testing unit, its DATA RESP and CAR RESP signals are coupled through the selection gates 124 and 111 to produce TSCF and TSBB signals as an inbound response at the upstream connection. Otherwise, the CLEXT testing unit converts the incoming response signals to TSCF' and TSBB' signals that are coupled through the selection gates 124 and 111 to become the TSCF and TSBB inbound response signals at the upstream connection.

Again referring to FIG. 2, the colocated testing unit 53 operates as an MPEXT testing unit. The configuration control 102 in FIG. 6 transmits the MPEXT signal which energizes the OR gate 145 in FIG. 7 to proudce the COLOC signal. When the line address character in a test control word corresponds to the line number for this testing unit, it receives the outbound request as TSCA and TSBA signals as previously described with respect to the CLEXT testing unit, and conveys them to the modem transmitter 136. As the outbound request passes through the testing circuit 103, it strips the line address character and substitutes the pad character. If the drop address character identifies a different testing unit, then the MPEXT testing unit also may substitute a command character.

The DATA RESP and CAR RESP signals are generated by the testing circuit 103 when the MPEXT testing unit is identified by the test control word. The selection gates 124 and selection gates 111 convey these signals to the upstream connection as the inbound response TSCF and TSBB signals. In the case of a different drop address, the TSCF' and TSBB' inbound response signals as the downstream connection are conveyed through the selection gates 124 and 111. The operation of an MPEXT testing unit changes, however, when a line address character in a test control word does not correspond to the line address for the testing unit. When this occurs, the testing circuit 103 produces a steady stream of "mark" signals notwithstanding the outbound request at the upstream connection. Moreover, neither input to the OR gate 154 is active, so the AND gate 155 disables the AND gates 156 and 157. Therefore, the selection gates 124 do not couple the TSCF' signals to the selection gates 111; and the circuit effectively turns off.

Thus, an MPEXT testing unit repeats the test control words downstream to other drops on its own line, except that it strips the line address character and substitutes a padding character for it. It also transmits back to the digital upstream connection its own repsonse or repeats the response from another downstream drop on its line. When the line address character identifies a different line, the MPEXT testing unit blocks the outbound request and prevents any inbound response.

It is also possible for a person to perform a test locally at a hubbing site by actuating a self-test switch that causes the testing unit 103 to generate the ST signal. The ST signal causes the selection gates 116, 124 and 131 in FIG. 6 to connect the output of the modem transmitter 136 to the modem receiver 110. As shown in FIG. 7, the ST signal turns on the TSCF and TSBB signals by energizing the OR gates 113 and 115. The AND gate 121 is deenergized, so the inverter 120 enables the TSBB' data signal to pass through the AND gate 147 which is enabled by the inverter 150 when the AND gate 133 is disabled. Other operations also occur within the testing circuit 103 and the host modem as will be described later.

Figure 8:
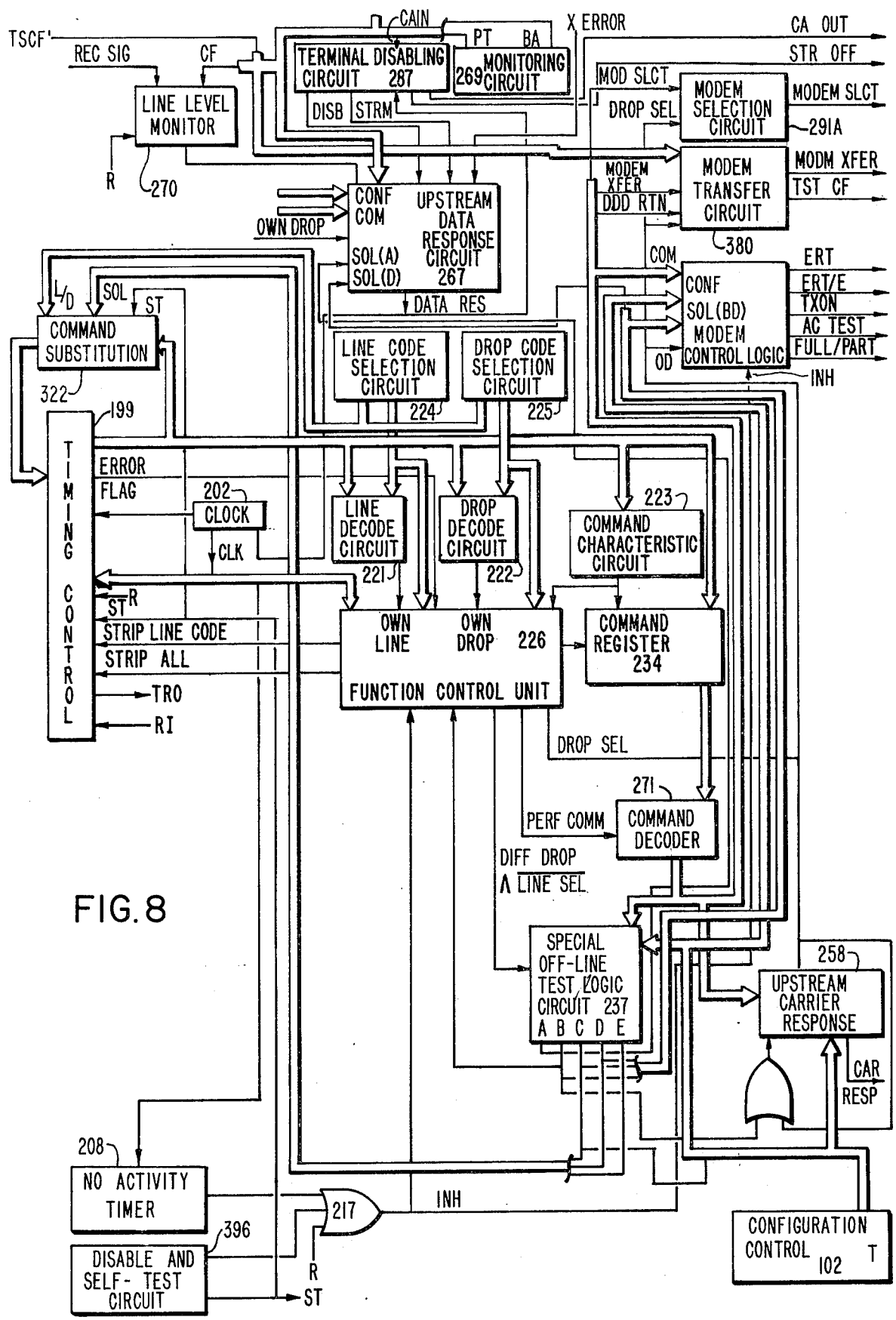
FIG. 8 is a block diagram of a testing unit for connection to a hubbing site.

FIG. 8 is a block diagram of the testing unit 103 shown in FIG. 6. When an outbound request is received, the test control word enters the testing circuit 103 as RI signals notwithstanding whether the testing unit is a hubbing, CLEXT or MPEXT testing unit. The RI signals enter a timing control circuit 199, shown in FIGS. 8 and 9, that comprises a conventional asynchronous receiver/transmitter 200. Referring more specifically to FIG. 9, the incoming RI signals are fed into a receiver register 201 in response to RRC clock signals from a clock 202 and, after a character is assembled, are shifted in parallel to a receiver holding register 203. The signals from the receiver holding register 203 are RR signals that represent, in sequence, the line address, drop address and command bytes in the test control word. During the assembly of each character, an error flag circuit 204 transmits a PE signal if a parity error occurs and an FE signal if a framing error is detected.

The PE and FE signals pass through inverters 205 and 206, respectively, to an AND gate 207 that connects to a "no activity" timer 208. If either error condition exists, the AND gate 207 is disabled so an inverter 210 applies an overriding resetting signal to a Johnson counter 211. At the same time, the AND gate 207 removes an overriding resetting signal from a Johnson counter 212. This enables the counter 212 to be incremented because an inverter 213 enables an AND gate 214 to pass phase clocking pulses from a clock divider 215 and an inverter 216 to the clocking input of the counter 212. As specifically shown in FIG. 9, the clocking pulses to the AND gate 214 occur at the clock rate divided by 256. When a ONE reaches the last position in the Johnson counter 212, the inverter 213 disables the AND gate 214. Simultaneously, an OR gate 217, also shown in FIG. 8, transmits an inhibiting (INH) signal.

If no errors occur, the AND gate 207 is enabled. Each time the receiver holding register 203 receives a byte, the asynchronous receiver/transmitter 200 transmits a DR signal. The DR signal enables a Johnson counter 220 to advance under a second series of pulse from the clock divider 215, at the clock frequency divided by 8 in this embodiment. After the Johnson counter 220 receives the first clocking pulse, it energizes the AND gate 207 and thereby resets the "no activity" timer 208 and enables the Johnson counter 211 to receive higher speed clock pulses from the clock divider 215 (the clock rate divided by 4 in this embodiment). When the Johnson counter 211 advances to its first state, it generates a SLCT CLK signal that initiates a decoding operation in the circuitry shown in FIG. 10.

Figure 10:
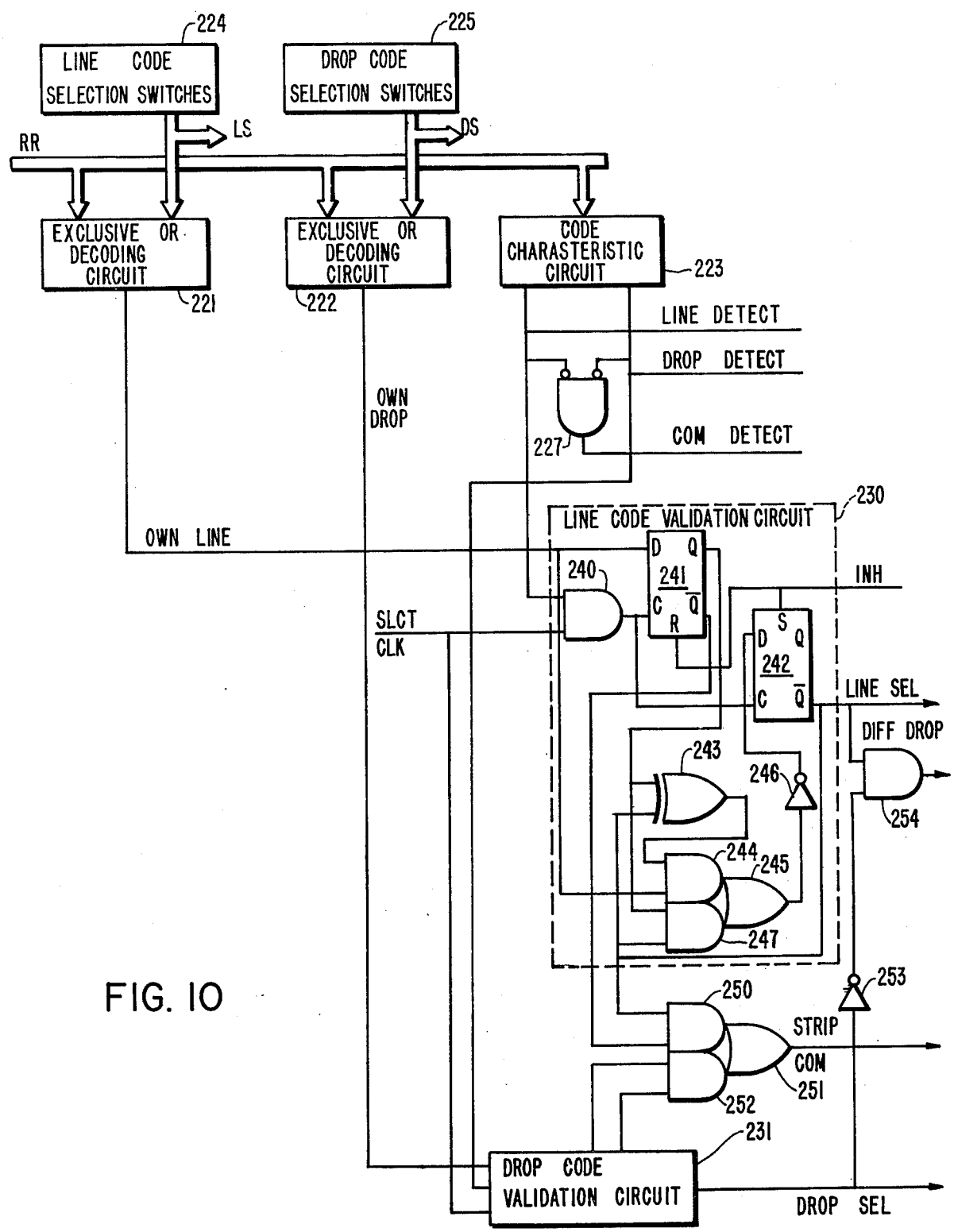
FIG. 10 is a detailed logic diagram of portions of the timing control unit and the function control unit shown in FIG. 8.

When the Johnson counter 211 transmits the SLCT CLK signal, the receiver holding register 203 is transmitting the RR signals onto an RR bus. As shown in FIG. 10, these signals are applied to the inputs of exclusive OR decoding circuits 221 and 222 and a code characteristic circuit 223. These circuits 221 and 222 also receive the respective LS and DS output signals from line and drop code selection switches 224 and 225. The decoders 221 and 222 generate OWN LINE and OWN DROP signals when the byte on the RR bus corresponds to the respective one of the signal sets from the switches 224 and 225. The OWN LINE and OWN DROP signals then pass to a function control unit 226 in FIG. 8.

Still referring to FIG. 10, as previously indicated, the drop address and command bytes have easily determined characteristics. Moreover, the line numbers are taken from these remaining eight-bit codes that also are easily detected. The code characteristic circuit 223 samples each byte on the RR bus. If the byte corresponds to a line number, it generates a LINE DETECT signal. A DROP DETECT signal is generated whenever the byte is a drop address byte. If neither condition exists a NOT AND gate 227 transmits a COM DETECT signal. The LINE DETECT and OWN LINE signals are routed to a line code validation circuit 230; the DROP DETECT and OWN DROP signals, to a drop code validation circuit 231. The COM DETECT signal passes circuitry in FIG. 9.

Referring to FIG. 9, the assertion of the COM DETECT signal causes an inverter 232 to remove an overriding resetting signal from another Johnson counter 233. The Johnson counter 233 establishes a three-pulse sequence at the clock rate when the Johnson counter 211 advances to the first state and a command byte is decoded. The first pulse from the counter 233 loads the command byte into a command register 234. The second pulse sets a test mode flip-flop 235 if an OR gate 236 is energized either by a DROP SEL signal or a signal from special offline test circuit 237 that is described later. The third pulse enables the special offline test circuit 237 to perform various functions and constitutes a PERF COMM signal.

FIG. 10 shows the line code validation circuit 230 in detail. The drop code validation circuit 231 comprises analogous circuitry and is shown only as a block diagram. The line code validation circuit 230 and drop code validation circuit 231 each must decode two successive line addresses and drop addresses that identify that testing unit before enabling the testing unit to shift to a test mode.

When the code characteristic circuit 223 generates a LINE DETECT signal, it enables an AND gate 240 to pass a clocking signal to both flip-flops 241 and 242. The INH signal from the OR gate 217 in FIGS. 8 and 9 initially resets and sets the flip-flops 241 and 242, respectively. If the OWN LINE signal is active, the SLCT CLK signal sets the flip-flop 241. With both flip-flops 241 and 242 set, an exclusive OR circuit 243 enables and AND gate 244. If the next line address character produces the OWN LINE signal, the AND gate 244 energizes an OR gate 245 so an inverter 246 conditions the flip-flop 242 to be cleared by the SLCT CLK pulse. When this occurs, the circuit 230 transmits a LINE SEL signal to indicate that two successive valid line addresses have been received. So long as successive valid line addresses are received, the flip-flops 241 and 242 energize the AND gate 240 to maintain the LINE SEL signal in an active state.

The LINE SEL signal is terminated if two successive line address characters identify a different line from that defined by the switches 224. When the first such character is received, the flip-flop 241 is cleared, so an AND gate 247 is deenergized. Simultaneously, the flip-flops energize an AND gate 250 and an OR gate 251 and generate a STRIP COM signal that prevents any further response to the prior command characters. Then the receipt of the next line address character causes the flip-flop 242 to set thereby terminating the LINE SEL signal.

The drop code validation circuit 231 performs the same functions. An AND gate 252 is energized by the circuit 231 to generate the STRIP COM signal under analogous circumstances.

When the flip-flop 242 generates the LINE SEL signal, but the drop code validation circuit 233 does not generate the DROP SEL signal, a signal from an inverter 253 and the LINE SEL signal energize an AND gate 254 thereby to generate a DIFF DROP signal indicating that a different drop on the same line as the modem has been addressed in a valid manner.

Now referring to FIG. 9, an inverter 255 applies an overriding resetting signal to the test mode flip-flop 235 when the LINE SEL signal is inactive. Once the LINE SEL signal is active, either the DROP SEL signal or a signal from the circuit 237 conditions the test mode flip-flop 235 to be set. The flip-flop 235 then enables an AND gate 256 to generate the CAR RESP signal, assuming a signal to an inverter 257 is inactive. The foregoing circuitry is part of the upstream carrier response circuit 258 shown in FIG. 8.

The Johnson counter 211 also controls the transfer of signals into the asynchronous receiver/transmitter 200 as described later. When the Johnson counter 220 reaches its third state, an inverter 259 generates a "ground assertion" DRR signal that clears the DR signal. By "ground assertion" we mean that a signal is TRUE if it is at a ground or LO level and FALSE if it is at a positive or HI level.

Referring again to FIG. 9, when the Johnson counter 233 clocks a command byte into the command register 234, the output signals from the command register 234 energize a command decoder 260 that produces a number of different signals corresponding to the particular command byte that is received. Certain of these signals pass to the special off-line test circuit 237.

Figure 11:
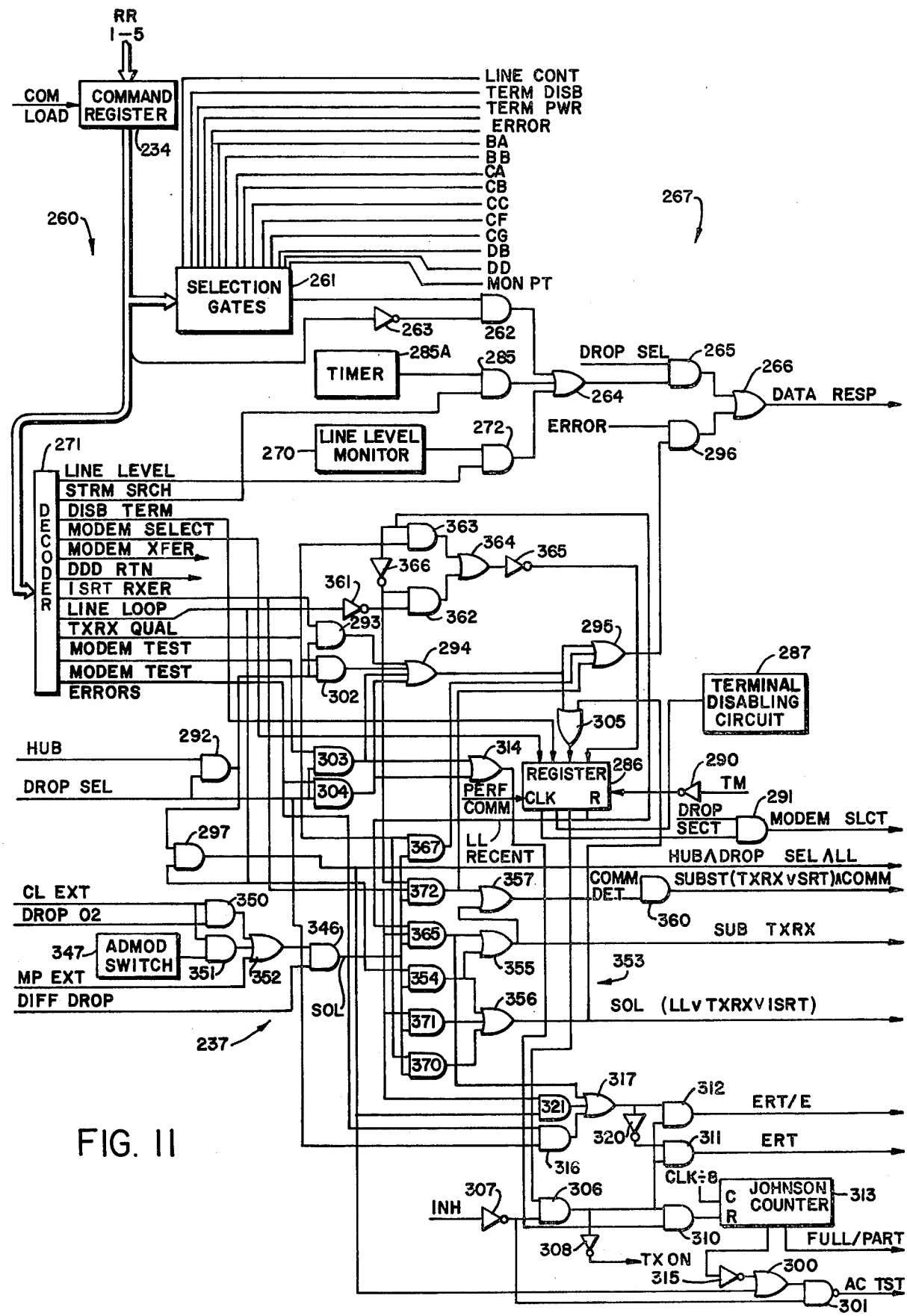
FIG. 11 is a detailed logic diagram of the portions of FIG. 8 including modem selection, modem transfer, modem control, special off-line testing logic and other related circuits.

The details of the command decoder 260 and special off-line test circuit 237 are shown in FIG. 11. Certain of the commands for testing the conditions of predetermined lines and other conditions, are coupled from the command register 234 to selection gates 261. The selection gates 261 select one such lead and couple the signal on that lead to an AND gate 262. An inverter 263 enables the AND gate 262 whenever one bit in the command code is not asserted. This bit is characterized by being inactive (i.e., having a ZERO value) whenever one of the commands corresponds to a test on one of the incoming leads to the selection gates; e.g., the left-most bit in FIG. 5. Thus, during these tests the AND gate 262 energizes an OR gate 264, so its output reflects the status of the selected signal. This output signal and the DROP SEL signal enable an AND gate 265 and OR gate 266 to produce the DATA RESP signal.

The selection gates 261 and the associated control circuitry in FIG. 11 constitute an upstream data response circuit 267 that also is shown in FIG. 8. The various status signals are obtained from a monitoring circuit 269, except in response to Commmand Nos. 4 or 5 (in FIG. 5) during which an ERROR signal is sampled by the upstream data response circuit 267.

Still referring to FIGS. 8 and 11, a line level monitor 270 in FIG. 8 responds to the REC SIG and CF signals from the host modem to couple a status signal to the upstream data response circuit 267. A command decoder 271 generates a LINE LEVEL signal in response to the corresponding command thereby to enable an AND gate 272 to couple the status signal to the OR gate 264. In effect, the line level monitor 270 energizes the AND gate 272 if the REC SIG signal level from the host modem is within a specified range. Otherwise, the AND gate 272 is disabled.

Figure 12:
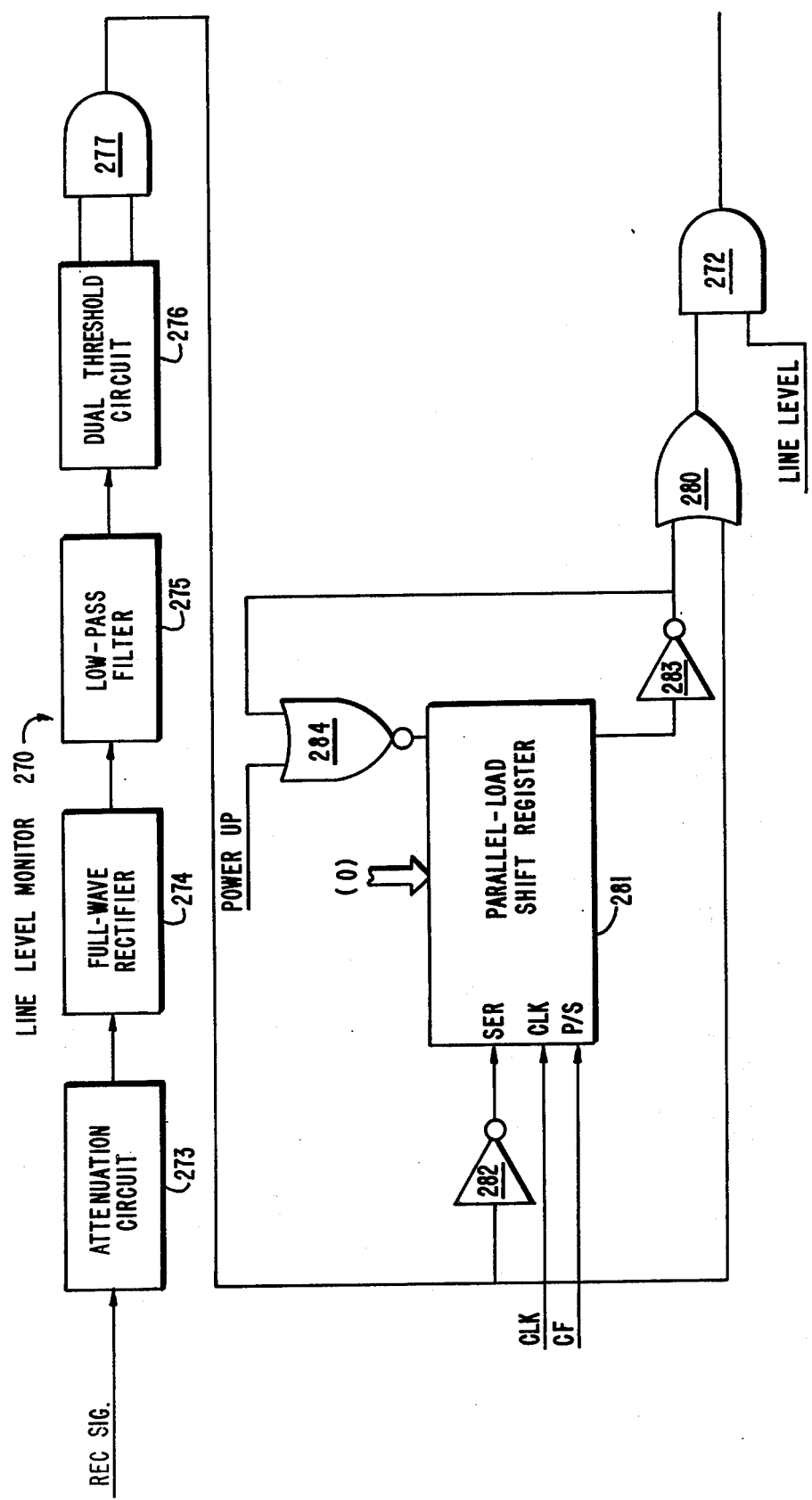
FIG. 12 is a detailed circuit schematic of the line level monitor shown in FIGS. 8 and 11.

Now referring to FIG. 12, the REC SIG signal enters the line level monitor 270 through an attenutation circuit 273. The attenuation circuit 273 compensates the REC SIG signal for changes to the signal level that are introduced by the host modem and that vary according to the rate at which data is transferred. A full-wave rectifier 274 converts this modified REC SIG signal into a varying d-c potential that is passed through a low-pass filter 275. The filter 275 has a short response time (e.g., about 4 milliseconds).

A dual threshold circuit 276 receives the output signal from the low-pass filter 275. If that signal lies within a predetermined range (i.e., $V_1 \geq$ REC SIG $\geq V_2$), the circuit 276 energizes an AND gate 277. When the AND gate 277 is energized, an OR gate 280 enables the AND gate 272 (shown in FIGS. 11 and 12). Thus, if the test unit in FIG. 8 receives a line level command, the AND gate 272 will be energized if the REC SIG signal is within acceptable limits.

If the REC SIG signal shifts outside the acceptable limits, the AND gate 277 is deenergized. However, the shift will not be reflected at the output of the OR gate 280 for some interval (i.e., until after a delay established by a parallel load, shift register 281).

So long as the CF signal from the host modem is active, the register 281 stays in a serial mode. While the AND gate 277 is energized, an inverter 282 conditions the SER input of the shift register 281 so ZEROES are shifted into its stages in response to clocking signals from the divider 215 in FIG. 9 (e.g., at the clock rate divided by 4). After an interval that is equivalent to the interval between those clock pulses multiplied by the number of stages in the shift register 281, the most significant bit position (i.e., the right-most position) produces a ZERO output signal, so an inverter 283 energizes the OR gate 280. Thus, if the REC SIG shifts outside the acceptable limits, the output signal from the monitor 270 does not change until after a predetermined delay. This prevents an incorrect reading if there is only a transient shift in the REC SIG level.

If the CF signal from the host modem terminates, the shift register 281 shifts into a parallel mode. A NOR gate 284 receives the signal from the inverter 283 as one input and conditions the right-most stage of the register 281. If the REC SIG signal level is within the predetermined limits when the CF signal terminates, the feedback loop through the NOR gate 284 holds the most significant register stage to a "cleared" state. Otherwise, the stage is held in a "set" state. Thus, the output signal from the line level monitor 270 "remembers" the REC SIG signal condition at the time the CF signal terminates.

Referring again to FIG. 11, The decoder 271 in FIG. 11 also produces other signals corresponding to other particular commands, including Command Nos. 16 through 23. An STRM SRCH signal in response to Command No. 16 in FIG. 5 enables an AND gate 285 to pass a signal from a timer 285A through the upstream data response circuit 267 to produce the DATA RESP signal. The timer 285A is actuated in response to the CA signal from the host modem and energizes the AND gate 285 if the CA signal remains active for longer than a predetermined interval. When this condition is sensed, the operator can send Command No. 17 thereby to cause the decoder 271 to generate the DISB TERM signal. This signal is loaded into a register 286 in response to the PERF COMM signal thereby to energize a terminal disabling circuit 287 until the test mode flip-flop 235 in FIG. 9 resets whereupon an inverter 290 resets the latch 286. However, the circuit 287 continues to disable the CA signal from the host modem in a manner as described in the aforementioned U.S. patent application Ser. No. 503,625 until the CAin signal turns off.

The PERF COMM signal loads the MODEM SELECT signal into the register 286 to enable an AND gate 291 that constitutes the modem selection circuit 291A in FIG. 8. The MODEM SLCT signal identifies the host modem as a back-up modem.

The responses of the host modem and a testing unit to Command Nos. 19 and 20 are described in U.S. application Ser. No. 665,256.

The remaining commands (i.e., Command Nos. 21, 22 and 23) produce "off-line" tests and the response of a hubbing site testing unit depends upon several factors, including the classification of the testing unit and the line and drop address characters in the test control word. Assume, first, that the hubbing testing unit 42 in FIG. 2 receives a test control word with line and drop address bytes designating the testing unit 42. Under these conditions, an AND gate 292 in FIG. 11 is energized and it enables several AND gates including an AND gate 293. When Command No. 21 is received, the resulting ISER RXER signal from the decoder 271 energizes the AND gate 293 and, through OR gates 294 and 295, enables an AND gate 296 to pass ERROR signals through the OR gate 266 to produce the DATA RESP signals. Moreover, an AND gate 297 is not energized so the inverter 257 in FIG. 9 enables the AND gate 256 to generate the CAR RESP signal.

When the command register 234 receives Command No. 22, the decoder 271 transmits a LINE LOOP signal that energizes the AND gate 297 thereby to block the CAR RESP signal from the AND gate 256 in FIG. 9. The AND gate 297 also energizes an OR gate 300 to enable a NAND gate 301 to transmit a "ground assertion" AC TST signal thereby to shift the host modem to a full ac loop back mode. No signals are returned on the test channel, and there is no upstream response.

Command No. 23 causes the decoder 271 in FIG. 11 to produce a TXRX QUAL signal. This signal energizes an AND gate 302 that is enabled by the AND gate 292. The OR gates 294 and 295 thereby enable to ERROR signal to pass through the AND gate 296 as the DATA RESP signal.

When the decoder 271 either the MODEM TEST or MODEM TEST ERRORS signal, it respectively enables an AND gate 303 or an AND gate 304. Both outputs pass through the OR gate 294 thereby enabling the AND gate 296 to produce the DATA RESP signal in response to the ERROR signals.

In addition to producing the AC TEST signal, the circuit in FIG. 11 also turns on a test transmitter in the host modem and controls the message that transmitter sends when it receives any of Command Nos. 4, 5 and 21 through 23 in FIG. 5. More specifically, whenever the OR gate 294 is energized, it also energizes an OR gate 305, so the corresponding stage in the register 286 sets and energizes an AND gate 306 that is enabled by an inverter 307 in the absence of an INH signal from the OR gate 217 in FIGS. 8 and 9. The AND gate 306 transmits a ground assertion TX ON signal through an inverter 308 that turns on the host modem transmitter. The AND gate 306 also enables AND gates 310, 311 and 312. Assuming that the INH signal is inactive and that the AND gate 310 is deenergized so a Johnson counter 313 contains all ONE's, the counter 313 produces a FULL/PART signal that establishes, with the AC TEST signal, a full AC loop back operating mode for the host modem.

In the case of Command Nos. 4 and 5, either the AND gate 303 or the AND gate 304 energizes on OR gate 314 thereby to provide a second input to the AND gate 310. This clears the Johnson counter 313 until the signals from the decoder 271 terminate. When the counter 313 is cleared, an inverter 315 energizes the OR gate 300 to generate the ground assertion AC TST signal and the counter 313 also produces a low level FULL/PART signal to shift the host modem into a partial AC loopback mode.

If Command No. 4 is received, the MODEM TEST ERRORS signal and DROP SEL signal energize an AND gate 316 and an OR gate 317 thereby to energize the AND gate 312 and generate an ERT/E signal. This signal causes the host modem to generate a pattern with inserted errors. For Command No. 5, an inverter 320 and the AND gate 306 energize the AND gate 311 thereby to generate an ERT signal. The ERT signal causes the host modem to produce a pattern without any inserted errors. If any errors are detected during these tests, they are reflected at the input of the AND gate 296 as ERROR signals.

In the case of Command No. 21, the ISER RXER signal from the decoder 271 and the DROP SEL signal energize an AND gate 321 thereby to energize the OR gate 317 and generate the ERT/E signal. Command No. 23 does not energize the OR gate 317, so the inverter 320 energizes the AND gate 311 to generate the ERT signal.

The response to Command Nos. 4, 5 and 21 through 23 differ when the test control word identifies a testing unit at a different drop on the same line or on a different line. In both situations a command substitution circuit 322 shown in FIGS. 8 and 9 and in detail in FIG. 13, produces special downstream command bytes that are substituted for the received command bytes in a test control word.

Figure 13:
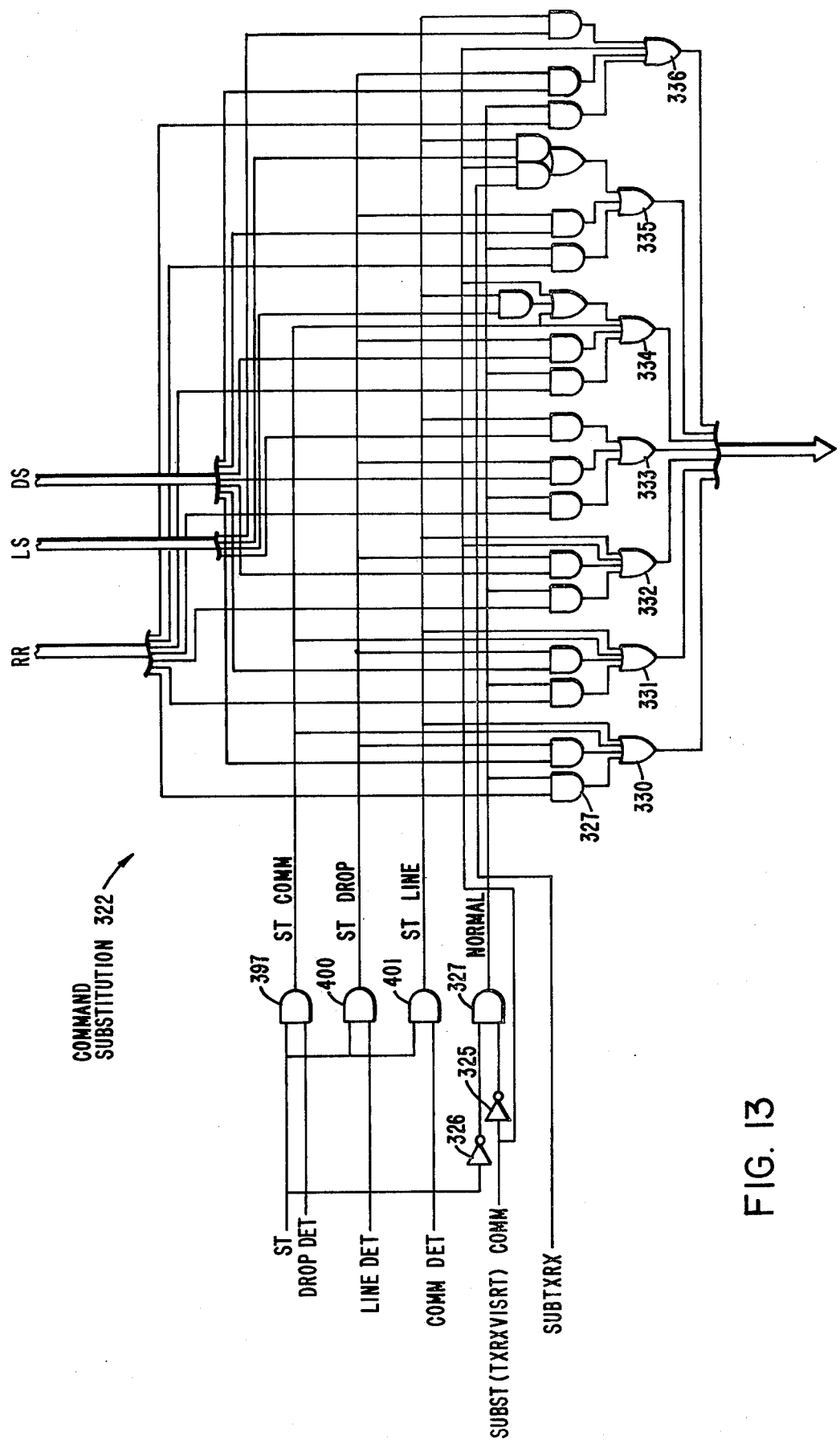
FIG. 13 is a detailed logic diagram of a command substitution circuit shown in FIG. 8.

Basically the command substitution circuit 322 shown in FIG. 13 couples information into an XMIT buffer register 323 in the asynchronous receiver/transmitter 200 shown in FIG. 9. The signals are then transferred to a XMIT register 324, and, under the control of TRC pulses from the clock 202, are coupled out as TRO signals to the selection gates 131 in FIG. 6. Again referring to FIG. 13, an inverter 325 and an inverter 326 enable an AND gate 327 associated with an OR gate 330 and corresponding AND gates associated with OR gates 331 through 336 thereby to transfer into the transmit buffer register 323, the output from the receiver holding register 203.

These signals are loaded into the transmit buffer register 323 in response to a THRL signal by circuitry that is shown in FIG. 9. When the Johnson counter 211 is cleared by the inverter 210, an OR gate 337 is energized by an inverter 340 thereby to energize an AND gate 341 and an OR gate 342. An inverter 343 that responds to the ST signal enables the AND gate 341. This circuitry produces a high level THRL signal.

When the Johnson counter 211 assumes a state of "110," reading from the left, the inverter 340 deenergizes the OR gate 337. The THRL signal shifts to a ZERO state and the transition loads the transmit buffer register 323.

Referring to the line and drop code validation circuits in FIG. 10, the OR gate 251 transmits a STRIP COM signal whenever a bad validation situation exists. The COM DETECT signal and the STRIP COM signal then energize an AND gate 344 and an OR gate 345 in FIG. 9. The OR gate 342 then is held at a high level so no transfers can occur. Thus, no command character byte will be repeated downstream.

Now referring to a CLEXT configuration, the CLEXT testing unit 51 in FIG. 2 normally repeats outbound requests and inbound responses. Moreover, if the CLEXT testing unit is identified by the line and drop address characters, then the testing unit performs the required test. However, when any of Command Nos. 21 through 23 are received that identify another testing unit, the special offline test logic circuit 237 shown in FIGS. 8 and 9 and in more detail in FIG. 11, alters this operating whenever an AND gate 346 generates an SOL signal, as now described.

Normally each channel in a network contains fewer than ten lines. However, if a greater number are necessary, it is possible to duplicate line numbers, so long as each modem has a unique address. When such duplication occurs, special steps must be taken at a relevant hubbing site. For example, if two or more downstream lines from a secondary hubbing site have the same line address, an ADMOD switch 347 in the CLEXT testing unit at an upstream, or primary hubbing site is set to a "vertical" position. If, on the other hand, the same line address is assigned to an upstream and a downstream line from a secondary hubbing site, the switch 347 in the primary hubbing site is set to a "horizontal" position and the hubbing testing unit in the secondary hubbing site is assigned a drop address of "02."

Still referring to FIG. 11, if the CLEXT testing unit at the primary hubbing site receives a "DROP 02" address, an AND gate 350 is energized. Alternatively, if the ADMOD switch 347 is in the "vertical" position, it enables an AND gate 351 that then is energized by the CLEXT signal. In either case, an OR gate 352 is energized and enables the AND gate 346 to generate the SOL signal thereby indicating that special conditions must be implemented in case of any off-line tests when a different drop on the same line is addressed. The SOL signal enables an array of gates 353.

For example, in response to command No. 22, the LINE LOOP signal from the decoder 271 in FIG. 11 energizes an AND gate 354 in the gating array 353 thereby to cause an OR gate 355 to generate a SUB TXRX signal (i.e., the SOL E signal in FIG. 8) and an OR gate 356 to transmit an SOL(LL+TXRX+ISRT) signal (i.e., the SOL B) signal. The SUB TXRX signal also energizes an OR gate 357 and, in the presence of a COM DECT signal causes an AND gate 360 to transmit a SUBST(TXRX + ISRT)COMM signal. These signals are conveyed to the command substitution circuit 322 shown in FIG. 13. The SUB TXRX signal and the SUBST(TXRX+ISRT)COMM signal energize the OR gate 335. This second signal also energizes the OR gates 332, 334 and 336. As a result, the command substitution circuit substitutes a TXRX QUAL command character for transmission downstream.

When the LINE LOOP signal is active, an inverter 361 disables an AND gate 362. Assuming that the register 286 is cleared, an LL RECENT signal from the right-most stage is inactive and it disables an AND gate 363. Thus an OR gate 364 is deenergized, so an inverter 365 conditions the right-most stage to be set by the PERF COMM signal. At the same time, the AND gate 354 and OR gate 356 energize the OR gate 305 to condition the corresponding stage to set thereby energizing the AND gate 306. As a result, the circuitry in FIG. 11 shifts the host modem into an ERT mode and turns on the transmitter by the TX ON signal. In this mode the AND gates 265 and 296 are disabled, so the CLEXT testing unit merely routes the TSBB' data signal from the modem receiver 110 in FIG. 6 through the selection gates 124 and 111 into the TSBB conductor as an upstream response.

If the operator wishes to perform the foregoing test with inserted errors, he follows the LINE LOOP command with an ISRT RXER command (Command No. 21). When the decoder 271 in FIG. 11 produces the LINE LOOP signal during the first command; the foregoing operation occurs. However, when the decoder 271 then generates the ISER RXER signal, that signal and signals from the AND gate 346 and register 286 energize an AND gate 365. The AND gate 365 energizes the OR gates 317 and 355 to generate an ERT/E signal to the host modem thereby to insert errors into the message and a SUB TXRX signal to repeat the TXRX QUAL command code downstream. Otherwise the operation is the same.

When the LINE LOOP signal terminates in the foregoing example, an inverter 366 disables the AND gate 362 so the right-most stage in the register 286 remains set until the test mode is completed. If the TXRX QUAL signal were to follow the LINE LOOP signal, the right-hand stage in register 362 would be cleared in response to the next PERF COMM signal.

When a TXRX QUAL signal is generated, no command substitution is made at the CLEXT testing unit. In this situation, output from the OR gate 305 sets the third stage of register 286 thereby to energize the AND gates 306 and 311. This produces the TXON and ERT signals. Moreover, an AND gate 367 energizes the OR gate 295 to enable the logical OR of the ERROR signals that are received from the host modem through the AND gate 296 and that are received over the TSBB' conductor in FIG. 6 to constitute the DATA RESP signals for the upstream response.

If the operator at the central site performs command Nos. 23 (TXRX QUAL) and 21 (ISRT RXER) in sequence, the CLEXT testing unit performs the TXRX QUAL test but transmits an ISRT RXER command downstream. The TXRX QUAL signal energizes the AND gate 367 and an AND gate 370 thereby to energize the OR gates 295, 356 and 305. The corresponding stage in the register 286 sets and energizes the AND gate 306 to produce the TXON and ERT signal.

When the ISRT RXER signal is energized, an AND gate 371 energizes the OR gate 356 so the TX ON signal remains active. Also the ISRT RXER and SOL signals and a signal from the inverter 366 energize an AND gate 372. As a result, the command substitution circuit 322 in FIG. 13 substitutes the ISRT RXER command in the outbound request at the downstream connection.

Similar responses occur in an MPEXT testing unit because the MPEXT signal energizes the OR gate 346 in FIG. 11 directly. If the testing unit decodes its own line address, the function control unit 226 in FIG. 8 generates a STRIP LINE CODE signal. Otherwise it generates a STRIP ALL signal. Referring specifically to FIG. 9, a LINE DETECT signal energizes an AND gate 374 and the OR gate 345 to block the transfer of the line address character into the buffer register 323. When a different line is addressed, the LINE SEL signal is inactive so an inverter 375 energizes an AND gate 376 during the duration of the entire test control word. Thus, nothing is transmitted downstream from an MPEXT testing unit if a different line is selected.

A modem transfer circuit 380 shown in FIG. 8 is shown in detail in FIG. 9. If a DA IN switch 381 is positioned as shown in FIG. 9, an inverter 382 enables an AND gate 383 to pass the signal from an AND gate 384 that is energized in response to the PERF COMM signal, the DROP SEL signal and the MODM XFER signal from the decoder 271 in FIG. 11. When the AND gate 383 is energized, it clears a binary counter 385. This disables an AND gate 386 and terminates the TSTCF signal. In addition, an inverter 387 transmits the MODM XYFER signal.

The DROP SEL signal enables an AND gate 390 to energize an OR gate 391 in response to the DDD RTN signal. When this occurs, an AND gate 392 passes CLK pulses at the rapid clock rate through an OR gate 393 to advance the counter 385 until a ONE appears in the most significant bit position. When this occurs, the MODM XFER signal terminates and the OR gate 393 is continuously energized so counter 385 can not advance.

Likewise, if the DROP SEL signal is "lost", an inverter 394 enables an AND gate 395 to pass slow clock pulses (e.g., the clock pulse divided by 256) from the clock divider 215 through the OR gate 393 to advance the counter 385 and thereby terminate the MODM XFER signal after a predetermined, longer interval. A PWR UP signal, generated when power is applied to the circuit, also energizes the OR gate 391 for normal operation.

In the self-test mode, a disable and self-test circuit 396 in FIG. 8 transmits the ST signal which is coupled to various circuits in FIG. 6 and also to the command substitution circuit shown in FIG. 13. The ST signal disables the AND gate 327 in FIG. 13 but enables AND gates 397, 400 and 401. As shown in FIG. 4, the timing sequence of characters is: line address—drop address— command. Thus, when the drop address has been assembled and decoded and the DROP DETECT signal (FIG. 10) is active, the command character is being assembled. Thus, the DROP DETECT signal energizes the AND gate 397 to generate an ST(COMM) signal while the COMM DET and LINE DET signals energize the AND gates 401 and 400 to generate ST(LINE) and ST(DROP) signals, respectively. The AND gate 397 enables the gates 330 through 336 to transfer a preset command into the transmitter buffer register 323 (FIG. 9) to encode a known character. The AND gate 401 enables the line address signals from the line code selection circuit 224 in FIG. 8 to be transferred; the AND gate 400 the signals from the drop code selection circuit 225. As a result, the host modem under test can be operated at the remote site.

In summary, there is described a testing unit that operates in accordance with the diverse objects that have been set forth therein. There has been disclosed only a single specific embodiment of this invention. However, it will be apparent that many different circuit arrangements can be used to implement this invention. Therefore it is the object of the appended claims to cover all such variations and modifications as come within the true spirit and scope of the claims.

What we claim as new and desire to secure by Letters Patent of the United States is:

1. An intermediate location testing unit for connection to a communication unit located at an intermediate location in a data communications network, the network additionally including first data transmission means for conveying signals to an upstream port of the communication unit from a central location, the communication unit also including a downstream port for conveying signals to other data transmission means that connect to remote locations, the signals having first characteristics at the upstream port and second characteristics at the downstream port, the data communications network further including a central testing unit at the central location for transmitting a test control word having a command portion and an address portion, said intermediate testing unit comprising:
   A. upstream receiving means for receiving the test control word in the form of signals having the first characteristic,
   B. address selection means for establishing an address for said intermediate testing unit,
   C. address decoding means coupled to said address selection means and said upstream receiving means for generating a test mode control signal when the address portion of a test control word corresponds to the established address for said intermediate testing unit,
   D. testing means responsive to the test mode control signal and the test control word for transmitting test response signals, and
   E. downstream coupling means for coupling the test control word downstream from said upstream receiving means in the absence of the test mode control signal, said intermediate testing unit converting the test control word at the upstream receiving means to signals having the second characteristic at the downstream coupling means.

2. An intermediate location testing unit as recited in claim 1 additionally comprising:
   F. first upstream means responsive to the test mode control signal for coupling the test response signals toward the central testing unit as the signals having the first characteristic, and G. second upstream means responsive to the absence of the test mode control signal for coupling signals having the second characteristic from locations remote to said intermediate location testing unit toward the central testing unit as signals having the first characteristic.

3. An intermediate location testing unit as recited in claim 2 wherein signals having the first characteristic are constituted by analog signals and signals having a second characteristic are constituted by digital signals, said intermediate location testing unit additionally comprising means for generating a configuration control signal for controlling the operation of said downstream coupling means and said first and second upstream means, said upstream receiving means comprising analog-to-digital conversion means and said downstream coupling means comprising digital-to-analog conversion means.

4. An intermediate location testing unit as recited in claim 3 additionally comprising means responsive to the configuration control signal for coupling the test control word from said analog-to-digital conversion means to said testing means and said address decoding means.

5. An intermediate location testing unit as recited in claim 2 wherein signals having the first characteristic are digital signals and signals having the second characteristic are analog signals, said intermediate location testing unit additionally comprising means for generating a configuration control signal for controlling the operation of said upstream receiving means, said downstream coupling means and said first and second upstream means, said downstream coupling means and said first and second upstream means, said downstream coupling means including digital-to-analog conversion means and said second upstream means including analog-to-digital conversion means.

6. An intermediate location testing unit as recited in claim 5 wherein said downstream coupling means includes means responsive to said configuration control signal for coupling the test control word to said digital-to-analog conversion means in said downstream coupling means.

7. An intermediate location testing unit as recited in claim 6 additionally including means responsive to the configuration control signal for isolating said testing unit from the other data transmission means that connect to remote locations by disabling said downstream coupling means and said second upstream coupling means.

8. A testing unit for connection in a data communications network at a location intermediate a central location and a remote location, a control unit at the central location including means for transmitting test control word signals and for responding to test response signals and the network including means for conveying signals between the central and intermediate locations and between the intermediate and remote locations, said testing unit comprising:

A. first connection means for connection to the conveying means from the central location, the signals at said first connection means being one of either analog or digital signals, B. second connection means for connection to the conveying means from the remote location the signals at said second connection means being the other of the analog or digital signals, (A)C. first conversion means for converting analog signals to digital signals, (B)D. second conversion means for converting digital signals to analog signals, (C)E. configuration control means for generating one of a plurality of configuration signals thereby to designate which of the analog and digital signals are at said first and second connection means, (D)F. testing means responsive to test control word signals in digital form for generating test response signals in digital form, and (E)G. gating means responsive to the configuration signals for interconnecting said first and second connection means, said first and second conversion means and said testing means, i. said gating means connecting said first connection means to said testing means through said first and second conversion means when said testing unit is connected with analog signals at said first connection means, and ii. said gating means connecting said second connection means to said testing unit through said first and second conversion means when said testing unit is connected with digital signals at said first connection means.

9. A testing unit as recited in claim 8 wherein the test control word signals define an address and said testing unit additionally comprises means for generating a selection signal when the defined address identifies said testing unit, said gating means being responsive to both the selection signal and the configuration signal.

10. A testing unit as recited in claim 9 wherein said gating means includes:

i. a first gating set responsive to a first one of the configuration signals for conveying test control word signals from said first conversion means to said testing means, ii. a second gating set responsive to the first one of the configuration signals for conveying test response signals to said second conversion means for transfer to the central location, iii. a third gating set responsive to a first one of the configuration control signals for conveying the test control word signals to a remote location, and iv. a fourth gating set for conveying test response signals from said testing means to said second gating set.

11. A testing unit as recited in claim 10 wherein said gating means additionally comprises:

v. a fifth gating set for conveying test response signals from a remote location, said fourth and fifth gating sets being responsive to the selection signal.

12. A testing unit as recited in claim 11 wherein said gating means additionally includes means for modifying the operation of said fourth and fifth gating sets.

13. A testing unit as recited in claim 9 wherein said gating means includes i. a first gating set responsive to second and third ones of the configuration signals for conveying test control word signals in digital form to said testing means, ii. a second gating set responsive to the second and third ones of the configuration signals for conveying test response signals from said testing means for transfer to the central location, iii. a third gating set responsive to the second and third ones of the configuration signals for conveying the test control word signals to said second conversion means for transfer to a remote location, and iv. a fourth gating set for conveying test response signals from said testing means to said second gating set.

14. A testing unit as recited in claim 13 wherein said gating means additionally comprises:

v. a fifth gating set for conveying test response signals from said first conversion means to said second gating set, said fourth and fifth gating means being responsive to the selection signal.

15. A testing unit as recited in claim 14 wherein said testing unit includes means responsive to the third one of the selection signals for modifying the test control word signals that are conveyed to the third gating means.

16. A testing unit as recited in claim 15 additionally including means responsive to the third one of the configuration signals and the defined address for disabling said fifth gating means whereby no test response signals from a location that is remote to said testing unit are conveyed toward the central location.

17. A testing unit as recited in claim 8 wherein the test control word signals define an address and a command, said testing means including:

i. address decoding means for generating a test mode signal and a selection signal in response to the address, ii. means responsive to the command and the test mode signal for performing a test at the intermediate location, iii. means responsive to the configuration signal and said command responsive means for generating the test response signals in digital form.

18. A testing unit as recited in claim 17 wherein said address decoding means includes:

A. means for establishing an address for the testing unit,

B. means for generating the selection signal when the address defined by the test control word signals corresponds to the address established for the testing unit, and C. means responsive to the selection signal for generating the test mode signal.

19. A testing unit as recited in claim 18 wherein said testing unit receives test word control word signals that correspond to repeated test control words, said selection signal generating means including memory means for storing, in succession, signals that indicate whether the address defined by the test control words repeatedly correspond to the address for the testing unit and means for generating the selection signal when such successive correspondences occur.

20. A testing unit as recited in claim 19 wherein said selection signal generating means includes means for disabling the testing means whenever there is a lack of address correspondence.

21. A testing unit as recited in claim 18 wherein each location in the data communications network is identified uniquely by the combination of a line address and a drop address and the test control word signals are sent in a repetitive fashion and include a line address, a drop address and a command, A. said testing unit address establishment means including means for generating line address signals and means for generating drop address signals that correspond to the line address and drop address for the location of that testing unit, B. said selection signal generation means includes:

i. first means for generating a line selection signal when the line addresses defined by the test control word signals and said line address generating means correspond, ii. second means for generating a drop selection signal when the drop addresses defined by the test control word signals and said drop address generating means correspond, iii. third means for storing the line selection signal each time said address decoding means decodes a line address, iv. fourth means for storing the drop selection signal each time said address decoding means decodes a drop address, v. fifth means responsive to the repeated storage of line and drop selection signals that indicate correspondences of the line and drop addresses defined by the test control word signals and said address establishement means for generating the selection signal.

22. A testing unit as recited in claim 21 wherein said fifth means in said selection signal generating means includes means responsive to a lack of address correspondence for generating a signal that disables said testing means.

23. A testing unit as recited in claim 17 wherein the command defined by the test control word signals may be taken from a first or second group of commands, said testing unit additionally comprising means for generating a special command signal in response to the configuration signals and the address defined by the test control word signals, said address decoding means including:

A. means for establishing an address for the testing unit,

B. means for generating the selection signal when the address defined by the test control word signals corresponds to the address established for the testing unit, and C. means responsive to the selection signal and to the special command signal for generating the test mode signal.

24. A testing unit as recited in claim 23 wherein each location in the data communications network is identified uniquely by the combination of a line address and a drop address, wherein the test control word signals define line and drop addresses, i. said address decoding means generating line selection and drop selection signals when the line and drop addresses defined by the test control word signals correspond to the line and drop address for the testing unit, and ii. said command responsive means including a. first control means responsive to the special command signal, the test mode signal and a command in the second group for enabling said command responsive means to perform predetermined test, and b. second means responsive to the special command signal for altering the response of the command responsive means to that command.

25. A testing unit as recited in claim 17 wherein:

A. said testing unit additionally includes a plurality of testing means for generating signals in digital form that correspond to the results of that test, and B. said testing means include:
  i. command decoder means for generating a command signal that corresponds to the command defined by the test control word signals,
  ii. means responsive to the command signal for selecting one of the testing means as a source of a test data signal, and
  iii. means responsive to the selection signals and the command signal for generating the test response signals, the test response signals reflecting the selected test data signal.

26. A testing unit as recited in claim 25 wherein the intermediate location includes data transmission means for conveying data signals in analog form between the central and remote locations through the intermediate location, wherein one of said testing means includes a line level monitor for generating a line level signal that indicates whether the energy level on the data transmission means is within acceptable limits and wherein one of the commands is a line level command, said one testing means being selected by said selecting means as the source for the test response signal in response to the line level command.

27. A testing unit as recited in claim 26 wherein said one testing means comprises:
  i. means for establishing an acceptable range of signal levels, and
  ii. means connected to the data transmission means for generating continuously a line level signal to indicate whether the signal on a data transmission means is within the acceptable range of signal levels.

28. A testing unit as recited in claim 27 wherein the intermediate location additionally comprises means for generating a first control signal when a signal is present on the data transmission means, said line level signal generating means additionally comprising:
  i. memory means for storing successive samples of the line level signal,
  ii. means for combining the continuous line level signal and a signal representing a stored value of the line level signal, and
  iii. means responsive to a termination of the first control signal for storing the line level signal in said memory means.

29. A testing unit as recited in claim 27 wherein said line level signal generating means includes:
  i. means connected to the data transmission means for generating an analog signal in response to the energy level of the signal on the data transmission means, and
  ii. means for generating a binary signal indicating whether the analog signal is within the acceptable range of levels.

30. A testing unit as recited in claim 27 wherein the intermediate location includes means for generating a power control signal upon the application of power to the location, said line level signal generating means additionally comprising means responsive to the power control signal for forcing the line level signal to a predetermined value that indicates the presence of a signal on the data transmission means within the acceptable range of levels.

31. A testing unit as recited in claim 25 wherein said testing unit connects to a modulator-demodulator circuit at the intermediate location that includes test points and testing circuits that respond to a plurality of control signals and generate error signals and wherein the test control word signals define one or a first or second plurality of commands, said testing means additionally comprising:
  iv. means responsive to test control signals that correspond to each of the first plurality of commands for conveying the signal from a test point selected by said command responsive selection means to said test response signal generating means,
  v. means responsive to test control signals that correspond to one of the second plurality of commands for generating test control signals for the testing circuits at the modulator-demodulator, and
  vi. means responsive to the test control signals that correspond to one of the second plurality of commands for conveying the error signals to said test response signal generating means.

32. A testing unit as recited in claim 31 wherein said testing means additionally comprises:
  vii. means responsive to the configuration signals for generating a special command
  viii. means responsive to the special command signal for altering the operation of said test control signal generating means and said error signal conveying means in response to certain ones of the second plurality of commands.

33. A testing unit as recited in claim 32 wherein a location that is remote to the intermediate location comprises a testing unit and a modulator-demodulator circuit with testing circuits that respond to a plurality of control signals and generate error signals and wherein said configuration control means at said intermediate location unit conditions said gating means to couple said first and second conversion means to data transmission means that convey signals between the intermediate and remote locations, said testing unit special commmand signal generating means additionally comprising means responsive to the address signals and the configuration signals for generating the special command signal and said testing means includes command substitution means responsive to the special command signal and certain ones of the second plurality of commands for substituting a command for the received command prior to transmitting the test word control signals to the remote location.

34. A testing unit as recited in claim 33 wherein one of the second plurality of commands is a line loop command and wherein:
  i. said testing control signal generating means corresponds to the configuration signals and the line loop command by generating test control signals that cause the testing circuits in the modulator-demodulator to transmit to test pattern onto the data transmission means, and
  ii. said command substitution means includes means for substituting a quality command for the command defined by the test control word signals that are transferred to the remote location, the testing circuits at the remote location transmitting a test pattern and producing test response signals as a function as error signals,
  iii. said gating means at said intermediate location conveying the test response signals from the remote location to the central location and
  iv. said gating means isolating the testing means at the intermediate location.

35. A testing unit as recited in claim 33 wherein the second plurality of commands includes a line loop command, a command for inserting errors and a quality command, and wherein:
  i. said test control signal generating means responds to the configuration signals and the receipt of the line loop and inserting error commands by generating test control signals that cause the testing circuits in the modulator-demodulator to transmit a test pattern that includes errors onto the data transmission means, and
  ii. said command substitution means includes means for substituting a quality command for the command defined by the test control word signals that are transferred to the remote location, the testing circuits at the remote location transmitting a test pattern and producing test response signals as a function of error signals in response to the quality command
  iii. said gating means at said intermediate location conveying the test response signals from the remote location to the central location, and
  iv. said gating means isolating the testing means at the intermediate location.

36. A testing unit as recited in claim 33 wherein one of the second plurality of commands is a transmitter-receiver quality command and wherein
  i. said test control signal generating means responds to the configuration signals and the transmitter-receiver quality command by generating test control signals that cause the testing circuits in the modulator-demodulator to transmit a test pattern onto the data transmission means,
  ii. said command substitution means being disabled so that the transmitter-receiver quality command is transferred to the remote location, the testing circuits at the remote location transmitting a test pattern and producing test response signals as a function of error signals, and
  iii. said gating means at said intermediate location includes means for combining the test response signals from the remote location and the error signals from said testing means as test response signals to be conveyed to the central location.

37. A testing unit as recited in claim 33 wherein one of the second plurality of commands includes a transmitter-receiver quality command and an insert errors command and wherein:
  i. said test control signal generating means responds to the configuration signals and the receipt of test control word signals defining the transmitter-receiver quality and insert errors commands in sequence by generating test control signals that cause the testing circuits in the modulator-demodulator to transmit a test pattern onto the data transmission means,
  ii. said command substitution means includes means for substituting the insert errors command for the command defined by the test control word signals that are transferred to the remote location, the testing circuits at the remote location transmitting a test pattern with inserted errors and producing test response signals as a function of error signals, and
  iii. said gating means at said intermediate location includes means for combining test response signals from the remote location and the error signals from said testing means as the test response signals to be conveyed to the central location.

38. A testing unit as recited in claim 17 wherein said test response signal generating means includes:
  A. means for generating a test data signal representing the results of the test, and
  B. means for generating a control signal for controlling the digital-to-analog conversion means.

39. A testing unit as recited in claim 38 wherein:
  A. said first conversion means includes means for generating test received data signals and test carrier detected signals in response to the receipt of test control word signals,
  B. said second conversion means includes means for generating a modulated carrier signal in response to incoming test response data and test response carrier signals, the test response carrier signal being generated in response to the control signal.

40. Apparatus for testing the level of a signal on a data transmission means at a remote location in response to a test control signal from a central location in a data communications network, said apparatus being located at the remote location and comprising:
  A. first means for establishing an acceptable range of signal levels,
  B. second means connected to the data transmission means for generating continously a line level signal in response to the signals on the data transmission means,
  C. means connected to said first means for generating a status signal that indicates when the line level signal is within the predetermined range, and
  D. means responsive to the receipt of the test control signal for transmitting a message back to the central location that indicates the status of the line level signal and thereby the level of the signals on the data transmission means.

41. Apparatus for testing the level of a signal in a data transmission means as recited in claim 40 wherein the remote location additionally comprises means for generating a first control signal when a signal is present on the data transmission means, said testing means additionally comprising:
  i. means for storing successive samples of the line level signal,
  ii. means for combining the continuous line level signal and a signal representing a stored value of the line level signal, and
  iii. means responsive to a termination of the control signal for storing the combined line level signal.

42. Apparatus for testing the level of a signal in a data transmission means as recited in claim 40 wherein said second means includes
  i. means connected to the data transmission means for generating an analog signal in response to the energy level of the signal on the data transmission means, and
  ii. means for generating a binary signal indicating whether the analog signal is within the acceptable range of levels.

43. Apparatus for testing the level of a signal on the data transmission means as recited in claim 40 wherein said remote location comprises means for generating a power control signal upon the application of power to the remote location, said apparatus additionally comprising means at the remote location responsive to the power control signal for forcing the line level signal at said testing means to a predetermined value that indicates the presence of a signal on the data transmission means within the acceptable range of levels.

44. A method for testing the level of a signal on a data transmission means at a remote location in response to a test control signal from a central location in a data communications network, said method comprising the steps of:
A. establishing at the remote location an acceptable range of signal levels,
B. generating continuously at the remote location a line level signal in response to the signals on the data transmission means,
C. generating at the remote location a status signal that indicates when the line level signal is within the predetermined range, and
D. responding at the remote location to the receipt of the test control signal by transmitting from the remote location a message to the central location that indicates the status of the line level signal and thereby the level of the signals on the data transmission means.

45. A method for testing the level of a signal on a data transmission means as recited in claim 44 wherein the remote location additionally comprises means for generating a first control signal when a signal is present on the data transmission means, said method additionally comprising steps of:
i. storing successive samples of the line level signals,
ii. combining continuous line level signal and one of the stored line level signals, and
iii. storing the last status of the combined line level signal upon a termination of the first control signal.

46. A method for testing the level of the signal on a data transmission means as recited in claim 44 wherein said continuous line level signal generating steps includes the steps of:
i. generating an analog signal in response to the energy level of the signal on the data transmission means, and
ii. generating a binary signal indicating whether the analog signal is within the acceptable range of levels, the binary signal constituting the continuous line level signal.

47. A method for testing the level of a signal on a data transmission means as recited in claim 44 additionally comprising the steps of generating at the remote site a power control signal when power is applied at the remote location, and forcing the line level signal at the testing means to a predetermined value that indicates the presence of a signal on the data transmission means within the established range of acceptable levels in response to the power control signal.

48. In a data communications network for interconnecting a central location and at least one remote location through an intermediate location wherein the central location includes test means for modulating a test carrier signal with a test control word, wherein each remote site includes a modem including testing circuits and a remote testing unit for controlling the remote modem testing circuits and wherein the intermediate location includes an upstream modem, a downstream modem and circuit means responsive to binary signals for interconnecting the upstream and downstream modems, each upstream and downstream modem having testing circuits, the improvement of an intermediate testing unit for connection to each modem at the intermediate location, each said testing unit including:

A. configuration control means for generating a first configuration signal when the corresponding modem is an upstream modem and a second configuration signal when the corresponding modem is a downstream modem,
B. testing means for generating a test response signal in response to a test performed on the corresponding modem, said testing means including:
i. means responsive to the test control word for generating a selection signal when the test control word identifies the testing unit,
ii. means responsive to the selection signal and first and second groups of the commands for generating the test response signal in response to signals from the modem testing circuits,
iii. means responsive to the selection signal and the second configuration signal for generating a special command signal,
iv. means responsive to the special command signal and the second group of commands for altering the response of the testing circuits in the modem to these commands, and
v. means responsive to the special command signal and predetermined ones of the second group of commands for substituting a command thereby to alter the test control signals that are transmitted to a remote testing unit.

49. A testing unit as recited in claim 48 wherein one of the second group of commands is a line loop command and wherein:
i. said testing control signal generating means responds to the configuration signals and the line loop command by generating test control signals that cause the testing circuits in the modem to transmit a predetermined test pattern onto the data transmission means,
ii. said command substitution means includes means for substituting a quality command for the command defined by the test control word that is transferred to the remote location, the testing circuits at the remote location transmitting a test pattern and producing test response signals as a function of error signals,
iii. said gating means at said intermediate location conveying the test response signals from the remote location to the central locations and
iv. said gating means isolating the testing means at the intermediate location.

50. A testing unit as recited in claim 48 wherein the second plurality of commands includes a line loop command, a command for inserting errors and a quality command and wherein:
i. said test control signal generating means responds to the configuration signals and the receipt of the line loop and inserting error commands in succession by generating test control signals that cause the testing circuits in the modem to transmit a test pattern that includes errors onto the data transmission means, and
ii. said command substitution means includes means for substituting a quality command for the command defined by the test control word that is transferred to the remote location, and testing circuits at the remote location to transmitting a test pattern and producing test response signals as a function of error signals, iii. said gating means at said intermediate location conveying the test response signals from the remote location to the central location, and iv. said gating means isolating the testing means at the intermediate location.

51. A testing unit as recited in claim 48 wherein one of the second plurality of commands is a transmitter-receiver quality command and wherein i. said test control signal generating means responds to the configuration signals and the transmitter-receiver quality command by generating test control signals that cause the testing circuits in the modem to transmit a test pattern onto the data transmission means, ii. said command substitution means being disabled so that the transmitter-receiver quality command is transferred to the remote location, the testing circuits at the remote location transmitting a test pattern and producing test response signals as a function of error signals, and iii. said gating means at said intermediate location includes means for combining the test response signals from the remote location and the error signals from said testing means as test response signals to be conveyed to the central location.

52. A testing unit as recited in claim 48 wherein one of the second plurality of commands includes a transmitter-receiver quality command and an insert errors command and wherein:

i. said test control signal generating means responds to the configuration signals and the receipt of test control word signals defining the transmitter-receiver quality and insert errors commands in sequence by generating test control signals that cause the testing circuits in the modem to transmit a test pattern onto the data transmission means, ii. said command subsitution means includes means for substituting the insert errors command for the command defined by the test control word signals that are transferred to the remote location, the testing circuits at the remote location transmitting a test pattern with inserted errors and producing test response signals as a function of error signals, and iii. said gating means at said intermediate location includes means for combining test response signals from the remote location and the error signals from said testing means as the test response signals to be conveyed to the central location.

* * * * *

UNITED STATES PATENT AND TRADEMARK OFFICE
CERTIFICATE OF CORRECTION

PATENT NO. : 4,055,808
DATED : October 25, 1977
INVENTOR(S) : Holsinger et al.

It is certified that error appears in the above-identified patent and that said Letters Patent are hereby corrected as shown below:

Col. 1, line 20, is "digital communications" should be
  --digital data communications--.
Col. 7, line 64, is "receiver/-transmitter" should be
  --receiver/transmitter--.
Col. 8, line 34, is "OR gate 112" should be --OR gate 122--.
Col. 9, line 11, is "AND gate and" should be --AND gate 134 and--
Col. 11, lines 27 and 28, is "AND gate 147 which" should be
  --AND gate 117. The TR0 signal then passes through the
  AND gate 147 which--.
Col. 11, line 59, is "phase" should be --phased--.
Col. 12, line 3, is "pulse" should be --pulses--.
Col. 14, line 30, is "attenutation" should be --attenuation--.
Col. 15, line 13, is "FIG. 11, The" should be --FIG. 11, the--.
Col. 15, line 42, is "application" should be --Application--.
Col. 16, line 9, is "decoder 271 either" should be
  --decoder 271 produces either--.
Col. 16, line 35, is "on OR" should be --an OR--.
Col. 16, line 63, is "response" should be --responses--.
Col. 17, line 7, is "a XMIT" should be --an XMIT--.
Col. 17, line 8, is "TRO" should be --TR0--.
Col. 17, line 44, is "237" should be --237,--.
Col. 17, line 46, is "operating" should be --operation--.

UNITED STATES PATENT AND TRADEMARK OFFICE
CERTIFICATE OF CORRECTION

PATENT NO. : 4,055,808

DATED : October 25, 1977

INVENTOR(S) : Holsinger et al.

It is certified that error appears in the above-identified patent and that said Letters Patent are hereby corrected as shown below:

Col. 17, line 49, is "are" should be --is--.
Col. 18, line 6, is "command" should be --Command--.
Col. 18, line 44, is "command;" should be --command,--.
Col. 19, line 4, is "command" should be --Command--.
Col. 19, line 44, is "XYFER" should be --XFER--.
Col. 19, line 55, is "pulse" should be --pulses--.
Col. 20, line 19, is "therein" should be --herein--.
Col. 21, lines 34 and 35, delete "said downstream coupling means and said first and second upstream means,"
Col. 22, line 1, is "(A)C." should be --C.--.
Col. 22, line 3, is "(B)D." should be --D.--.
Col. 22, line 5, is "(C)E." should be --E.--.
Col. 22, line 9, is "(D)F." should be --F.--.
Col. 22, line 12, is "(E)G." should be --G.--.
Col. 23, line 54, is "correspond" should be --corresponds--.
Col. 24, line 23, is "establishement" should be --establishment--.
Col. 26, line 1, is "one or" should be --one of--.
Col. 26, line 55, is "transmit to" should be --transmit a--.
Col. 26, line 63, is "function as" should be --function of--.
Col. 29, line 29, is "signal" should be --signals--.

Signed and Sealed this

Twenty-eighth Day of October 1980

[SEAL]

Attest:

SIDNEY A. DIAMOND

Attesting Officer

Commissioner of Patents and Trademarks